(12) United States Patent
Baneth

(10) Patent No.: US 7,624,355 B2
(45) Date of Patent: Nov. 24, 2009

(54) SYSTEM AND METHOD FOR CONTROLLING A USER INTERFACE

(76) Inventor: Robin C. Baneth, 523 Pace St., Raleigh, NC (US) 27604

( * ) Notice: Subject to any disclaimer, the term of this patent is extended or adjusted under 35 U.S.C. 154(b) by 805 days.

(21) Appl. No.: 10/855,812

(22) Filed: May 27, 2004

(65) Prior Publication Data

US 2005/0268247 A1 Dec. 1, 2005

(51) Int. Cl.
G06F 3/048 (2006.01)
G06F 3/00 (2006.01)

(52) U.S. Cl. .................. 715/802; 715/862; 715/866; 715/822; 715/865; 715/828

(58) Field of Classification Search .............. 715/802, 715/862, 866, 822, 865, 828
See application file for complete search history.

(56) References Cited

U.S. PATENT DOCUMENTS

| | | | | |
|---|---|---|---|---|
| 5,151,951 | A | * | 9/1992 | Ueda et al. .................. 382/156 |
| 5,271,068 | A | * | 12/1993 | Ueda et al. .................. 382/216 |
| 5,603,065 | A | * | 2/1997 | Baneth .......................... 710/73 |
| 5,818,423 | A | | 10/1998 | Pugliese et al. |
| 6,005,549 | A | * | 12/1999 | Forest ........................ 345/157 |
| 6,016,478 | A | * | 1/2000 | Zhang et al. .................... 705/9 |
| 6,075,534 | A | | 6/2000 | VanBuskirk et al. |
| 6,078,308 | A | | 6/2000 | Rosenberg et al. |
| 6,211,856 | B1 | * | 4/2001 | Choi et al. .................. 345/666 |
| 6,219,032 | B1 | | 4/2001 | Rosenberg et al. |
| 6,424,357 | B1 | | 7/2002 | Frulla et al. |
| 6,433,775 | B1 | * | 8/2002 | Gould et al. ................. 345/157 |
| 6,434,547 | B1 | | 8/2002 | Mishelevich et al. |
| 6,499,015 | B2 | | 12/2002 | Brooks et al. |
| 6,526,318 | B1 | | 2/2003 | Ansarinia |
| 6,885,363 | B2 | * | 4/2005 | Smith ........................ 345/157 |
| 7,125,228 | B2 | * | 10/2006 | Dexter et al. ................ 417/299 |
| 7,356,775 | B2 | * | 4/2008 | Ruelle et al. ................. 715/802 |
| 2002/0126153 | A1 | * | 9/2002 | Withers et al. .............. 345/773 |

OTHER PUBLICATIONS

"T-Cube: A Fast, Self-Disclosing Peb_based Alphabet", Apr. 1994. http://portal.acm.org/citation.cfm?doid=191666.191761.*
Photo Post PHP."Photo Post"; Web Publishing Date: Jun. 8, 2003. http://www.photopost.com/manual/userinterface.html.*

* cited by examiner

*Primary Examiner*—Doug Hutton
*Assistant Examiner*—Soumya Dasgupta
(74) *Attorney, Agent, or Firm*—Coats & Bennett, P.L.L.C.

(57) ABSTRACT

A system and method permits user control of a graphical user interface displayed to the user. The system comprises a user input device communicatively connected to a computing device. The computer device includes a display to display a graphical user interface, and a controller configured to partition the graphical user interface into a plurality of objects. The controller sets a focus to one of the objects responsive to a user input signal, and is configured to change the focus between the objects provided a user generates subsequent user input signals before a predetermined period of time expires. After the predetermined period of time expires and no user input signals have been received, the controller automatically selects the object having the current focus.

60 Claims, 26 Drawing Sheets

SYSTEM AND METHOD FOR CONTROLLING A USER INTERFACE

BACKGROUND

The present invention relates generally to computing devices, and particularly to user interfaces for computing devices.

The need to control a computer without using one's hands extends to those with physical impairments, those who work in extreme environments, and those who want to increase their productivity with multi-modal input. Effective hands-free computer usage has widespread appeal to the approximately 20 million people within the United States who have some form of mobility impairment. In addition, voice recognition as a primary input mechanism is rife with inconsistency and difficulties that leave the door open to alternative technologies that could be leveraged for anything from underwater tool usage and salvage operations to extra-terrestrial repairs and construction, including futuristic vehicular, drone, and wheelchair control.

The notion of universal accessibility in which the highest degree of access is proffered to all users has great societal validity. Bringing disabled and disenfranchised citizens into the workforce has positive implications for economic indices. The numbers are larger than expected as movement disabilities can result from severe arthritis, strokes, accidents, neuromuscular dysfunction, deformity, amputation, paralysis, spinal problems, and cumulative trauma disorders. In addition, repetitive motion disorders from prolonged keyboard use and/or mouse usage, such as carpal tunnel syndrome, can result in an inability to perform remunerative employment. In the past, these people have been largely excluded or displaced from the work force, resulting in a tremendous loss of productivity both for society and for them. Despite the sporadic acceptance of telecommuting, the exclusion of physically-challenged persons from the work force is largely a result of high accommodation costs, and is exacerbated by the perception that affected persons are unable to compete effectively in the work force.

With adaptive devices, it is possible to integrate physically-challenged persons into the work force at a workplace or in their home, and to provide a greater degree of independence for such persons. One such adaptive device is disclosed in U.S. Pat. No. 5,603,065, which is incorporated herein by reference. These devices, coupled with the use of computers, can remove many of the barriers that physically-challenged people face. Typically, the user interacts with a graphical user interface displayed on the computer display to navigate and execute associated functionality. However, navigation using conventional interfaces can still be cumbersome for physically-challenged users. For example, some interfaces may require the direct selection of an icon or menu item to execute its associated functionality. This can be difficult for a person using an aspiration-driven input device, such as the type disclosed in the '065 patent, or a person lacking fine motor skills using a mouse or joystick-type control. Likewise, accurately invoking commands to a computer while simultaneously using one's hands for manual tasks, such as loosening and tightening bolts is equally difficult for the non-physical-challenged. Accordingly, there is a need for an interface that responds efficiently to user input to further ease the burden on physically-challenged persons, and to expand the capabilities for non-disabled persons.

SUMMARY

The present invention provides an interface that permits a user to control navigation and selection of objects within a graphical user interface (GUI). In one embodiment, an electronic device is connected to a hands-free user input device. The user operates the hands-free input device to generate user input signals, which are sent to the electronic device. A controller within the electronic device is configured to navigate between interface objects responsive to the user input signals, and select interface objects in the absence of the user input signals.

In one embodiment, the controller is configured to partition the GUI into a plurality of selectable objects. The controller is also configured to set a focus to one of the objects, and navigate between the objects whenever a user generates an input signal before a timer expires. Each time the controller navigates to a new object, it changes the focus to the new object. The controller will automatically select the object having the current focus if the user does not provide input signals before the expiration of the timer.

The GUI may be conceptually viewed as having multiple levels with each level including its own objects. At the lowest level, selection of an object causes an associated function to be executed. Further, each level may be viewed as containing a subset of objects of the level immediately above. The user can navigate between objects at the same level, or between levels, in the GUI.

DETAILED DESCRIPTION

Figure 1:
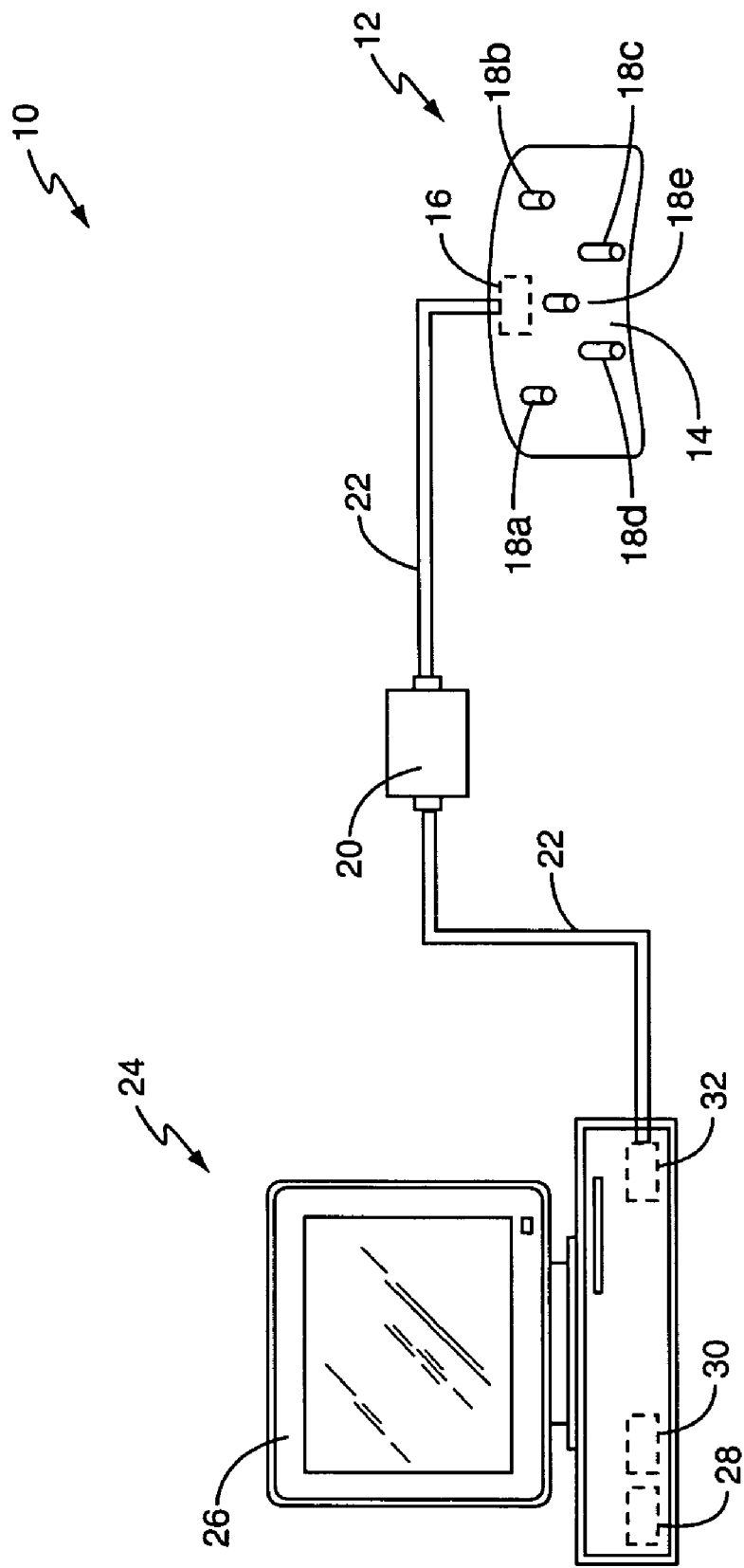
FIG. 1 illustrates a possible system in which one embodiment of the present invention may operate.
Figure 2:
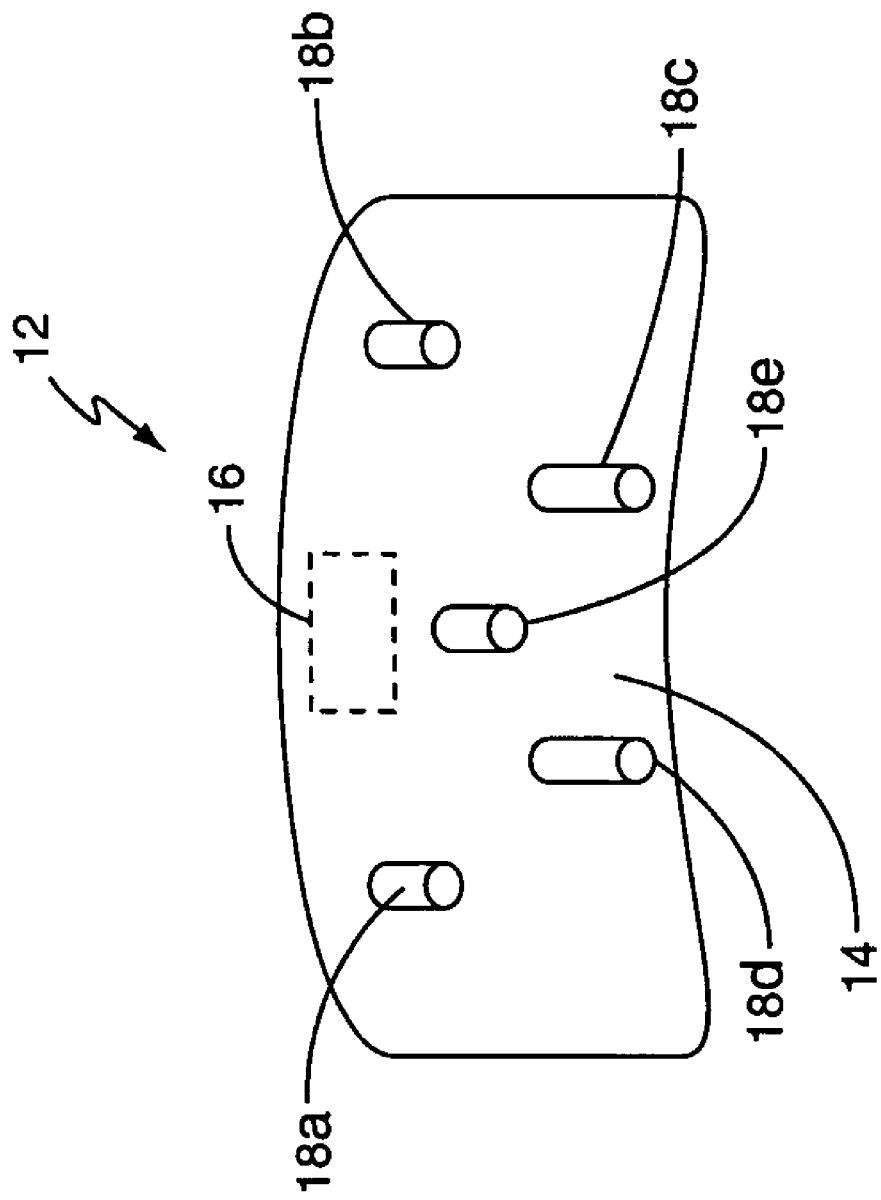
FIG. 2 illustrates a front view of a hands-free input device that may be used with one embodiment of the present invention.

Referring now to FIGS. 1 and 2, a system that uses one embodiment of the present invention is shown therein and generally indicated by the number 10. System 10 comprises a hands-free user input device 12 and a computing device 24 interconnected by a cable 22. Input device 12 operates similarly to the hands-free device disclosed in the '065 patent and permits hands-free control of a computer for both persons with physical limitations, and workers needing their hands for other tasks. For detailed information regarding hands-free input device 12, the interested reader is directed to the '065 patent. However, a brief description is included herein for completeness and clarity.

Input device 12 comprises a housing 14, and a plurality of cells 18a-18e arranged in tiers. A physically-challenged person, or worker needing two hands for other tasks, may use input device 12 to enter commands into computing device 24 by selectively aspirating (i.e., exhaling or inhaling) through one or more cells 18a-18e. In one embodiment, each cell 18 includes a pressure transducer that generates output signals responsive to sensed pressure. In another embodiment, a sound transducer, such as musical instrument digital interface (MIDI) transducer 16, detects sounds generated when the user inhales or exhales through a cell 18. In this case, each cell 18a-18e produces a unique sound depending on whether the user inhales or exhales through the cell 18. The MIDI transducer 16 converts these unique sounds into digital signals and transmits them to computing device 24 via communications interface 20. As will be described in more detail below, software running on the computing device 24 uses the digital signals to navigate about the graphical user interface, and to control various computer functions and software available in popular systems.

In the embodiment shown in FIG. 1, the input device 12 comprises five cells 18a-18e. The functionality of each of these cells 18 will be described later in more detail. However, in one embodiment of the present invention, four cells 18a-18d provide navigational and selection control to the user, while cell 18e, centered generally in the middle of the face of device 12, provides control over various modes of the interface of the present invention. As seen later in more detail, this includes providing control over various software programs, such as on-screen keyboards for example.

Input device 12 may include more or fewer cells 18, and may be arranged and/or spaced according to specific needs or desires. As seen in the figures, cells 18a-18e are generally arranged in three rows. Cells 18a and 18b comprise row 1, cell 18e comprises row 2, and cells 18c and 18d comprise row 3. Typically, cells 18 are offset vertically and/or horizontally from each other such that no two cells are positioned directly over or under each other. For example, cell 18a is not aligned directly above cell 18d, and cell 18b is not aligned directly above cell 18c.

Cells 18 are also proximally spaced and arranged in a general concave arc, with the lower cells 18c and 18e being slightly longer than the upper cells 18a, 18b, and 18c. Generally, the length of cell 18a is equivalent to that of cell 18b, and the length of cell 18c is equivalent to that of 18d. However, it should be understood that cells 18 may be the same or similar lengths as needed or desired. The optimized spacing minimizes the need for head and neck movement by the user, and the arc-like arrangement, combined with the cell offset, makes it less likely that the user's nose will interfere with the upper rows of cells when using the lower rows of cells. Further, cells 18 are symmetrically placed permitting users to easily become familiar with the cell layout.

Computing device 24 represents desktop computers, portable computers, wearable computers, wheelchair-mounted computers, bedside computing devices, nurse-call systems, personal digital assistants (PDAs), and any other electronic device that may use the interface of the present invention. Device 24 comprises a display 26, a controller 28, memory 30, and a port 32. Display 26 displays a graphical user interface and other data to the user. Controller 28 may comprise one or more microprocessors known in the art, and controls the operation of computing device 24 according to program instructions stored in memory 30. This includes instructions that permit a user to navigate and control the functionality of computing device 24 via input device 12. Memory 30 represents the entire hierarchy of memory used in electronic devices, including RAM, ROM, hard disks, compact disks, flash memory, and other memory not specifically mentioned herein. Memory 30 stores the program instructions that permit controller 28 to control the operation of computing device 24, and stores data such as user data. Port 32 receives user input from input device 12, and may be a universal serial bus (USB) port, for example.

As previously stated, navigation using conventional interfaces can be cumbersome for physically-challenged users and those that need their hands to perform other tasks. Particularly, some interfaces may require the direct ambulatory selection of an icon or menu item to execute its associated functionality. The present invention, while still permitting direct selection, deviates from conventional interfaces in that it does not require direct selection. Rather, the present invention provides a method that allows the user to cyclically navigate through a graphical user interface (GUI) 40 and select objects on the GUI 40 by instituting a time delay selection technique.

The GUI 40 is conceptually viewed as having multiple levels. At the lowest level, selection of an interface object causes an associated function to be executed. Each higher level may be viewed as containing a subset of objects in the level immediately below. The user can navigate between objects at the same level, or navigate between levels, in the GUI 40.

In a preferred embodiment of the invention, a multi-level grid is superimposed over a conventional GUI 40. As seen in FIGS. 3-7, for example, the grid includes pairs of vertical and horizontal intersecting lines 42 and 44. The first level of the grid corresponds to the first level of the GUI 40, and divides the area of the GUI 40 into four regions or quadrants. For clarity, these four regions correspond to the directions of a compass, and are referred to herein as the northwest region (NW), northeast region (NE), southeast region (SE), and southwest region (SW). The second level of the grid corresponds to the second level of the GUI 40, and divides the area of the GUI 40 into sixteen regions. Each region NW, NE, SE, and SW at the first level encompasses four regions at the second level, which may be referred to as sub-regions. Each of the sub-regions covers an area equal to approximately one-fourth of a region at the first level. Similarly, each sub-region encompasses objects on the desktop level of the GUI 40. Objects in the desktop level correspond to a third level of the GUI 40, and include pulldown menu items, buttons, icons, and application text. Desktop objects may also encompass other objects at a lower level. For example, a pulldown menu item may contain a sub-menu with several lower level menu items. The sub-menu or other lower level object corresponds to a fourth level in the GUI 40. It should be noted that the present invention does not require a minimum or maximum number of levels.

In operation, the user navigates clockwise or counterclockwise between objects at a given level. The user can also navigate between levels by selecting or deselecting objects at the current level. When the user selects an object, the user is then allowed to navigate among objects contained within the selected object.

Figure 3A:
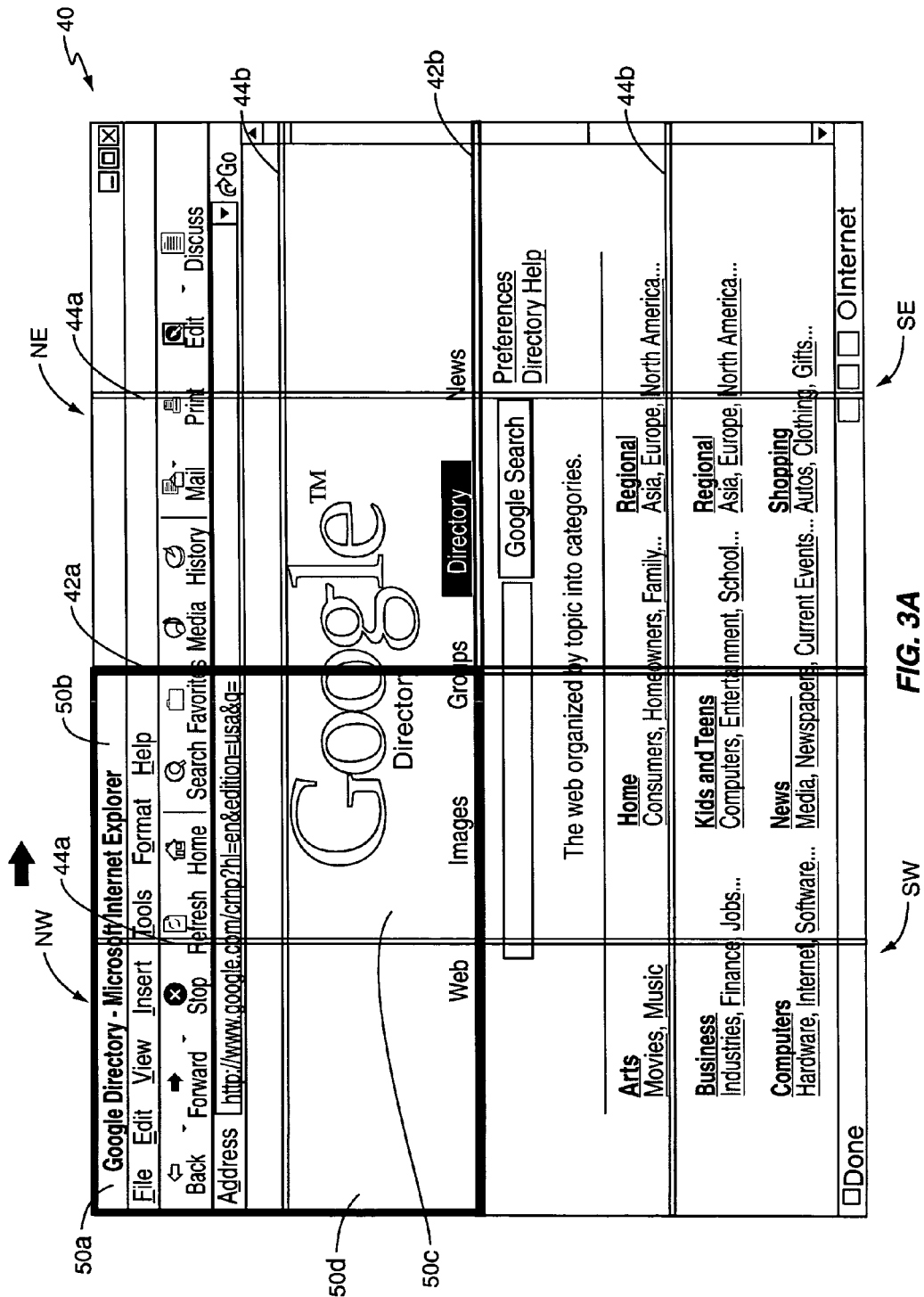
FIGS. 3A-3D illustrate a method of navigating a display using one embodiment of the present invention.
Figure 3B:
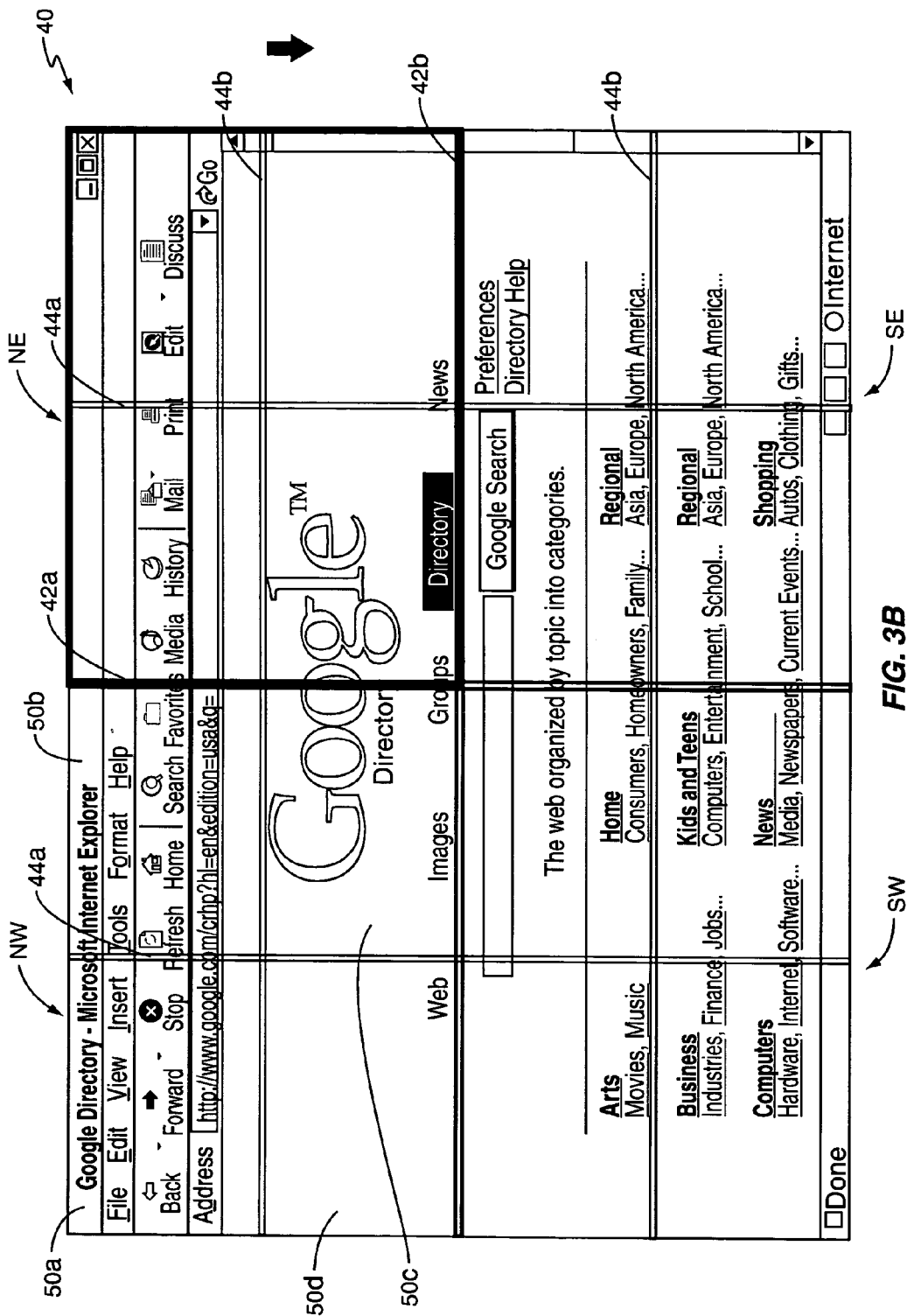
Figure 3C:
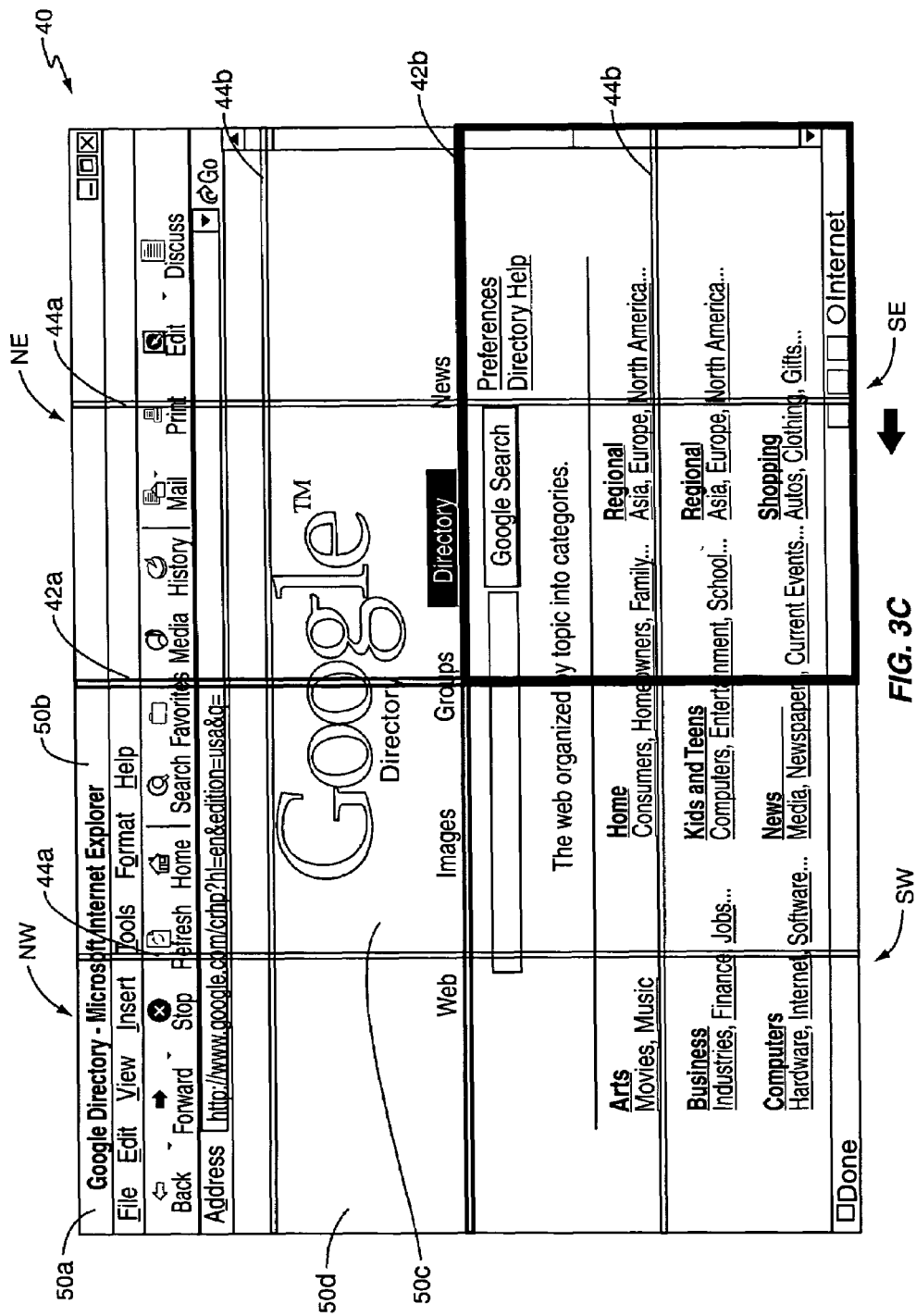
Figure 3D:
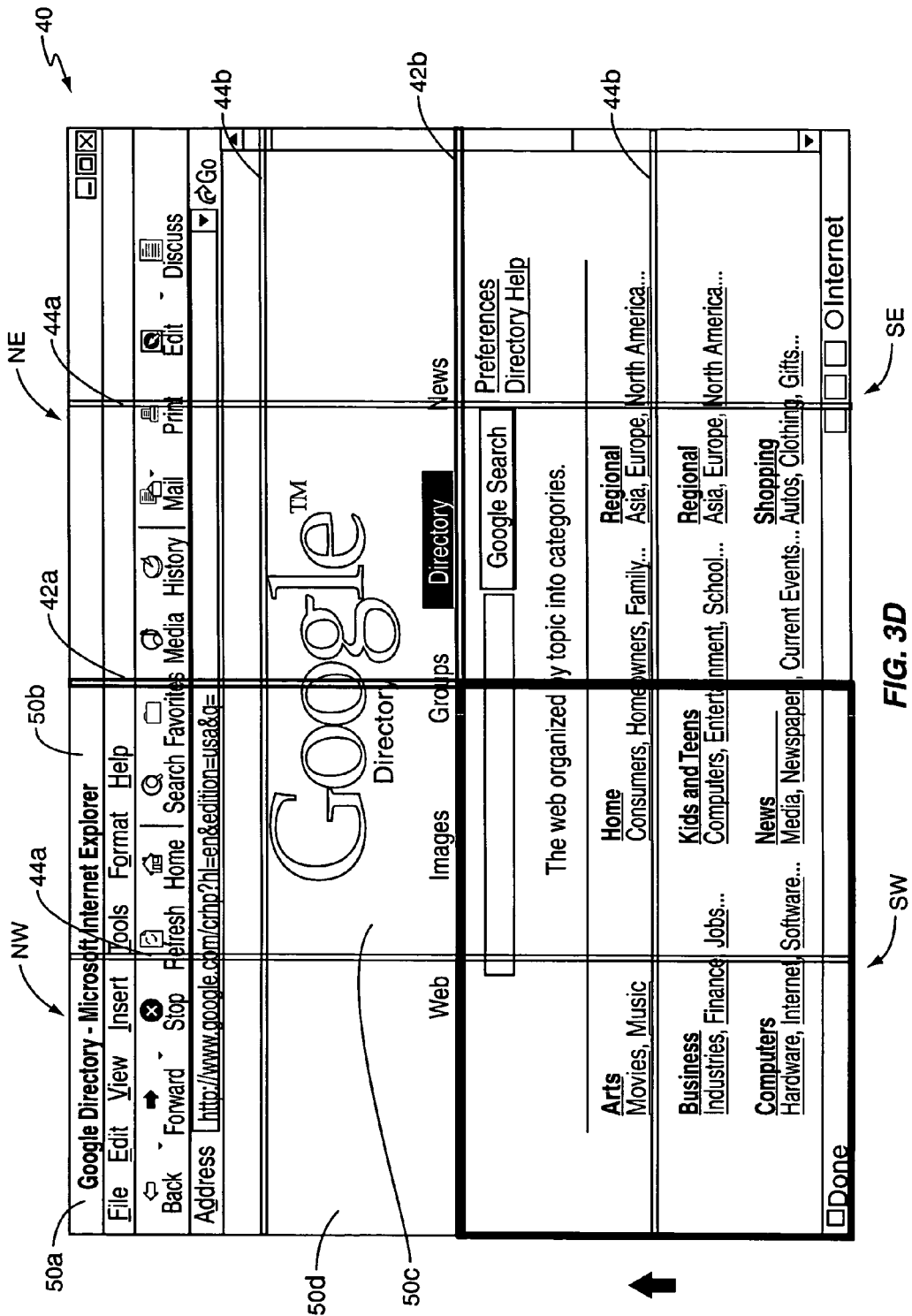
Figure 4A:
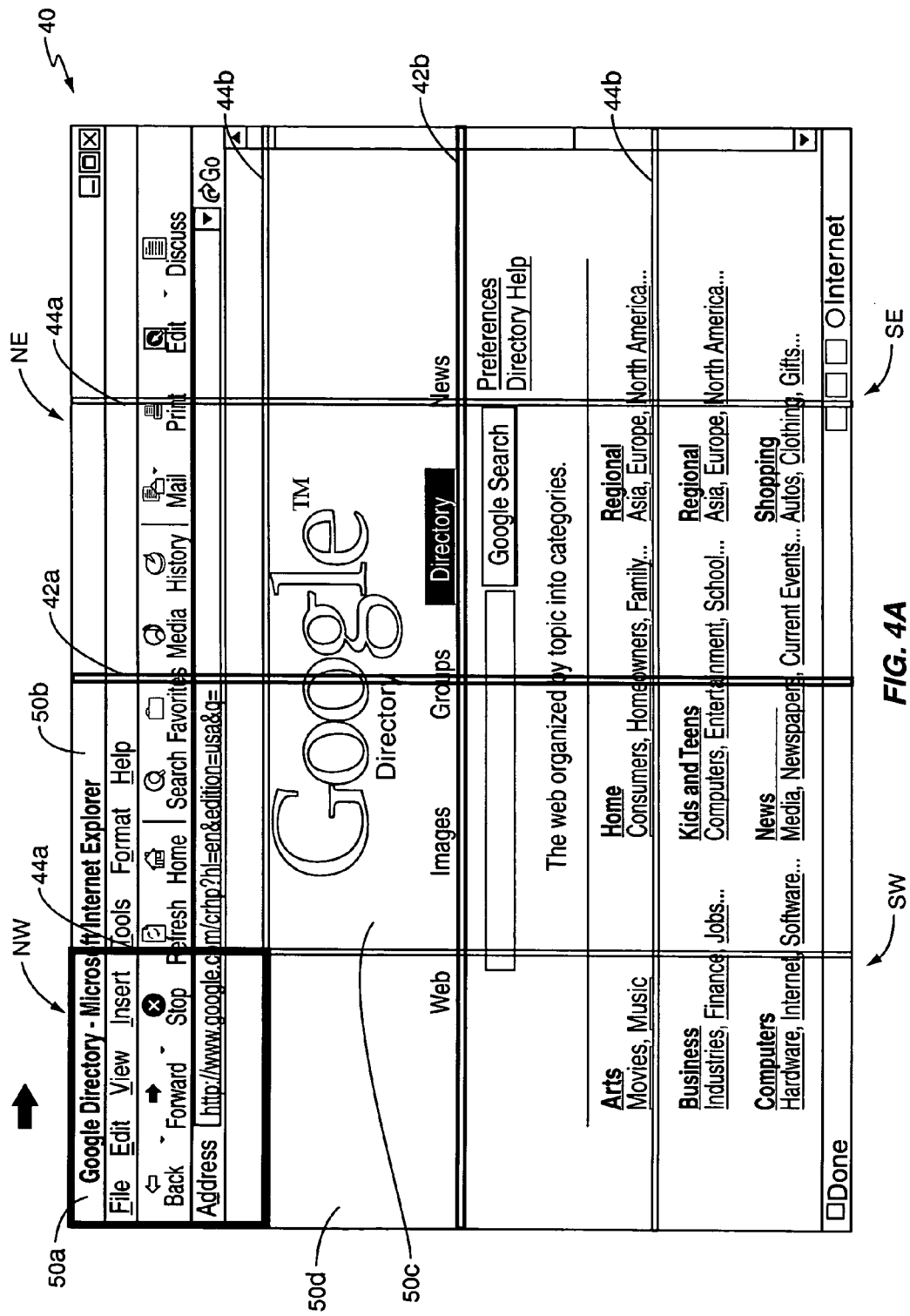
FIGS. 4A-4D further illustrate the method of navigating the display using one embodiment of the present invention.
Figure 4B:
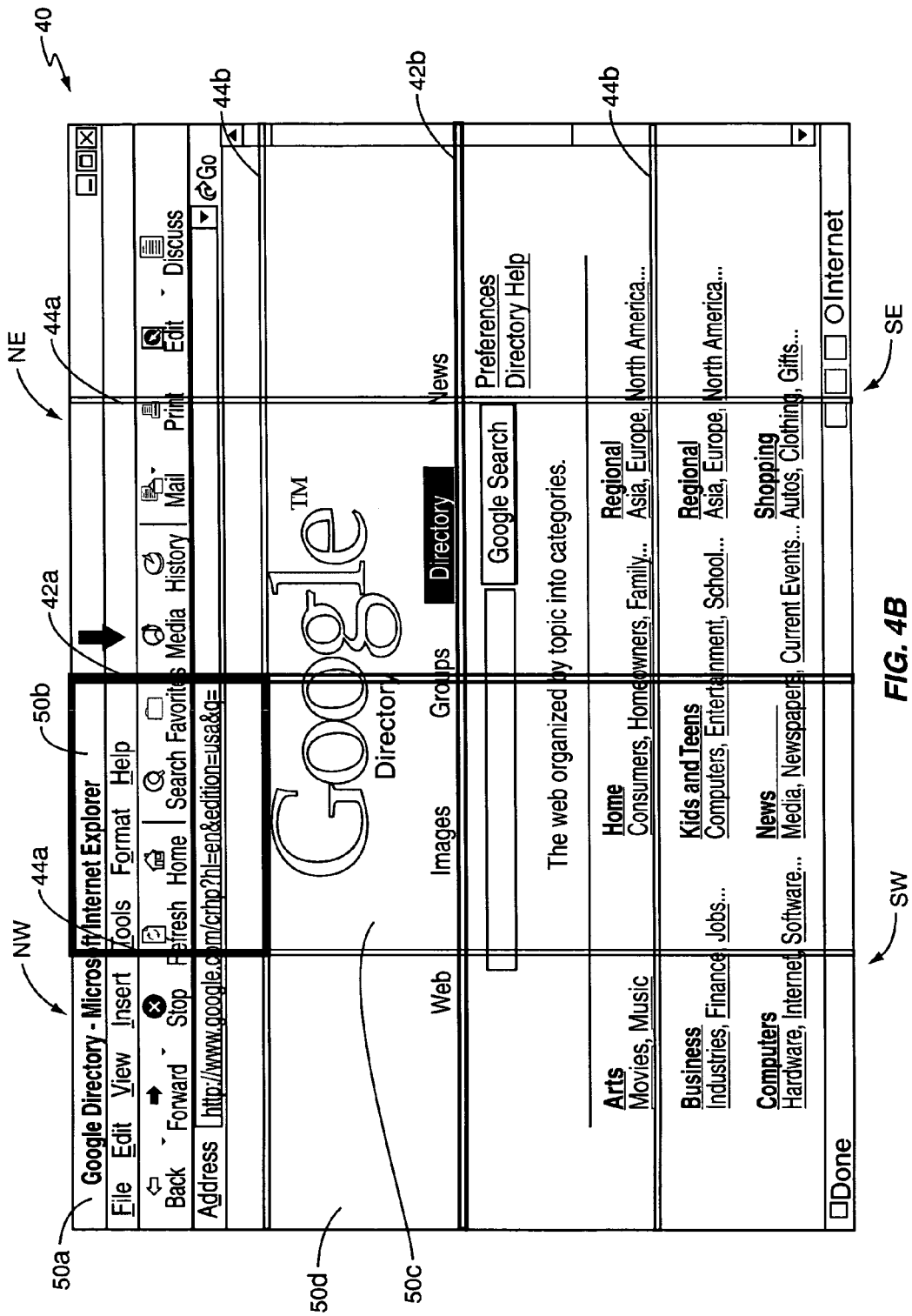
Figure 4C:
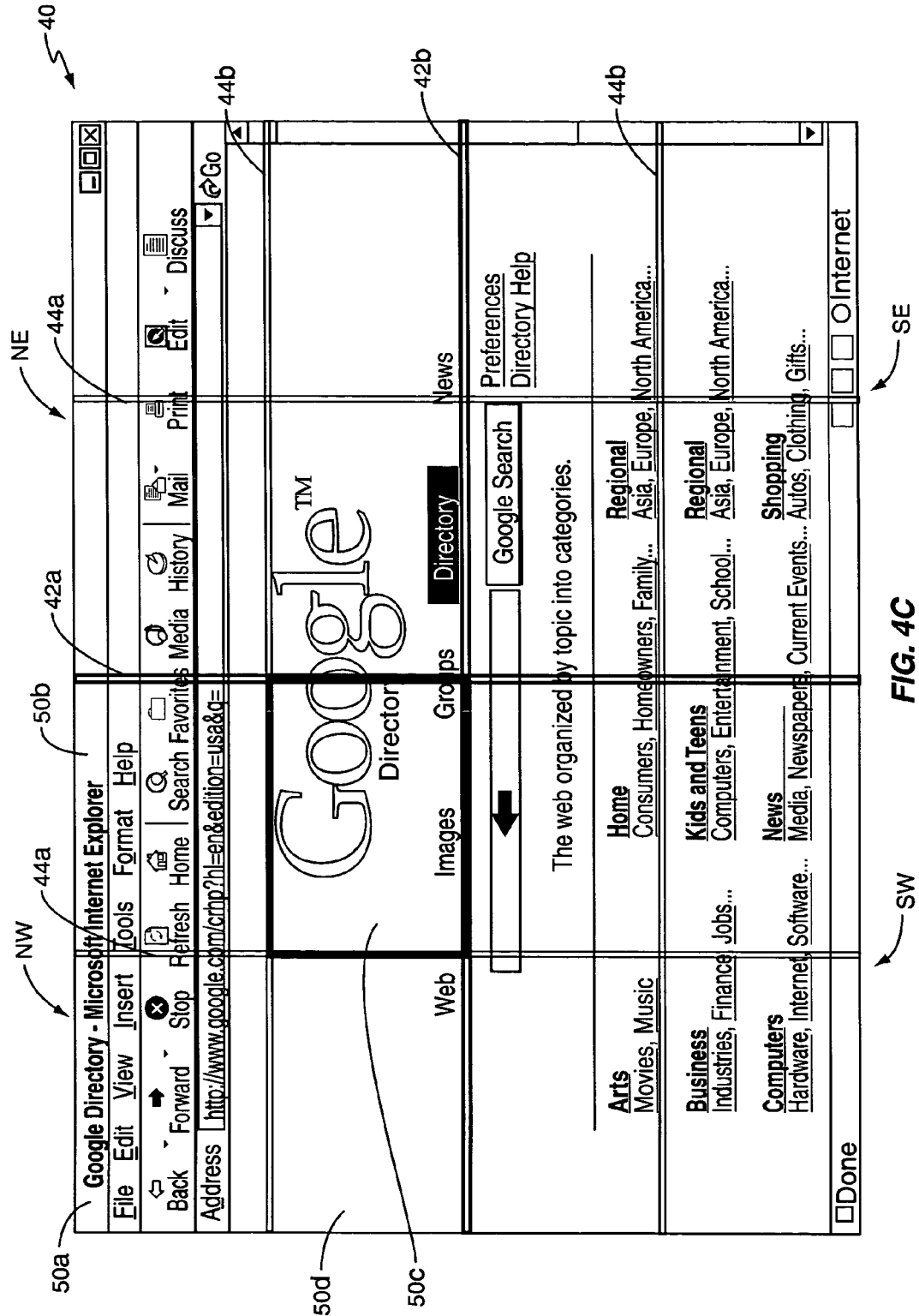
Figure 4D:
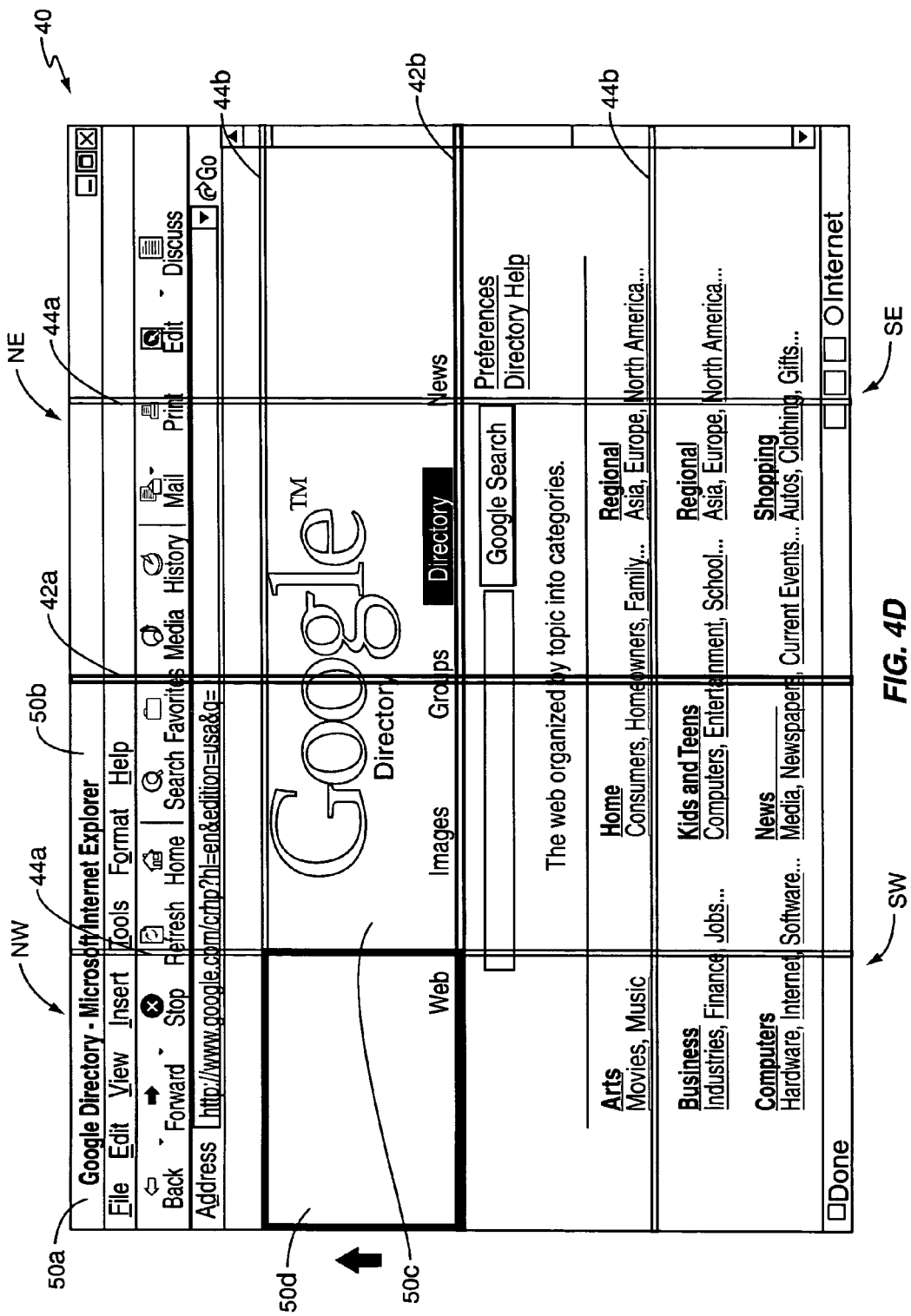

FIGS. 3A-3D, for example, illustrate navigation around the NW, NE, SE, and SW regions at the first level of GUI 40. For illustrative purposes, the solid arrows on the figures show the direction of navigation as being a clockwise direction. However, as described in more detail below, navigation might also be in a counter-clockwise direction. As seen in FIG. 3A, controller 28 partitions GUI 40 into the NW, NE, SE, and SW regions by overlaying a pair of intersecting grid lines 42a, 42b on GUI 40. Controller 28 further partitions each region into the plurality of sub-regions by overlaying additional pairs of grid lines 44a and 44b over GUI 40. By way of example, region NW in FIG. 3A is partitioned into four sub-regions 50a-50d.

Initially, a focus is given to one of the regions, which in FIG. 3A is region NW. In one embodiment, the user sets the focus to a desired region simply by inhaling or exhaling into one of the cells 18. In another embodiment, controller 28 sets the focus to a particular default region. Whatever the method of setting the initial focus, controller 28 indicates which region receives the focus by highlighting the region's border. This is shown in FIG. 3A by the solid box around region NW, however, the present invention also contemplates other methods of indicating which region receives the focus, such as various forms of shading or opacity.

To navigate or change the focus from one region to another, the user inhales or exhales into one of the cells 18 on input device 12. Thus, a second exhale causes controller 28 to change the focus from region NW in FIG. 3A to region NE in FIG. 3B. Likewise, third and fourth exhales change the focus to regions SE and SW in FIGS. 3C and 3D, respectively. With each successive exhale, controller 28 indicates the focus change by highlighting the border around the region receiving the focus. The ability to navigate between regions (or sub-regions and/or GUI objects as described below) by changing focus responsive to successive user input signals is referred to herein as "cycling." The arrows in FIGS. 3A-3D illustrate clockwise cycling each time the user exhales into one of the cells 18. However, the user could also cycle in a counter-clockwise direction by inhaling on one of the cells 18.

Of course, the user may also exhale into any cell 18 to give the focus directly to a region without cycling. In this case, the present invention may be configured such that cells 18a, 18b, 18c, and 18d correspond to the NW, NE, SE, and SW regions, respectively. Exhaling into any of these cells 18a-18d would change the focus directly to its corresponding region. For example, the user may change the focus from the NW region in FIG. 3A directly to the SW region in FIG. 3D simply by exhaling into cell 18d. As above, controller 28 would indicate the focus change by highlighting the border surrounding SW region.

In addition to cycling, the present invention also provides a method that allows the user to automatically select an object (e.g., a region, sub-region, or desktop level object) having the current focus. In this method, direct selection by clicking, for example, is not required. More particularly, controller 28 starts and manages a timer responsive to the user input signals. This timer is a user-configurable threshold that determines the amount of time a user may "dwell" (i.e., remain) on an object having the current focus before providing a subsequent input signal via input device 12. If the timer expires before the user provides a subsequent input signal, controller 28 may take some predetermined action. In one embodiment, controller 28 selects the region, sub-region, or desktop level object having the current focus. This time delay selection of a particular object having the current focus, as opposed to direct user selection, is referred to herein as an "autoclick."

Continuing with the example of FIGS. 3A to 3D, controller 28 started a timer when the user initially set the focus to the NW region by exhaling into cell 18a (FIG. 3A). The user now has a predetermined amount of time (e.g., 2 seconds) in which to dwell in region NW (i.e., remain in region NW). If the user exhales into one of the cells 18 before the timer expires, controller 28 cycles to region NE (FIG. 3B), indicates the focus change by highlighting region NE, and restarts the timer. Region NE now has the current focus, and the user has two more seconds in which to cycle to the SE region (FIG. 3C) by providing a successive input signal. If the timer expires before the user provides the input signal, controller 28 autoclicks (i.e., selects) the NE region (FIG. 3B) because that region has the current focus. Once a region is selected, subsequent user input signals will be directed to cycling between or selecting the objects within the scope of the selected region. For example, the NW region in FIGS. 4A-4D has been selected, and the user may cycle through sub-regions 50a-50d in the same manner as described above. That is, successive exhales into one of the cells 18 cause successive sub-regions 50b-50d to receive the change in focus. As when cycling through the regions, controller 28 indicates the sub-region receiving the focus by highlighting the appropriate sub-region border.

As above, it is also possible at this second level to configure the present invention to allow the user to set the focus directly to any of the sub-regions 50a-50d. In this case, cells 18a-18d would be re-mapped to correspond to sub-regions 50a-50d, respectively. Thus, the present invention permits various mappings of cells 18 to objects on the GUI 40 (i.e. regions, sub-regions, and desktop level objects) depending upon which object or level (region, sub-region, or desktop level object) is currently selected.

Figure 5A:
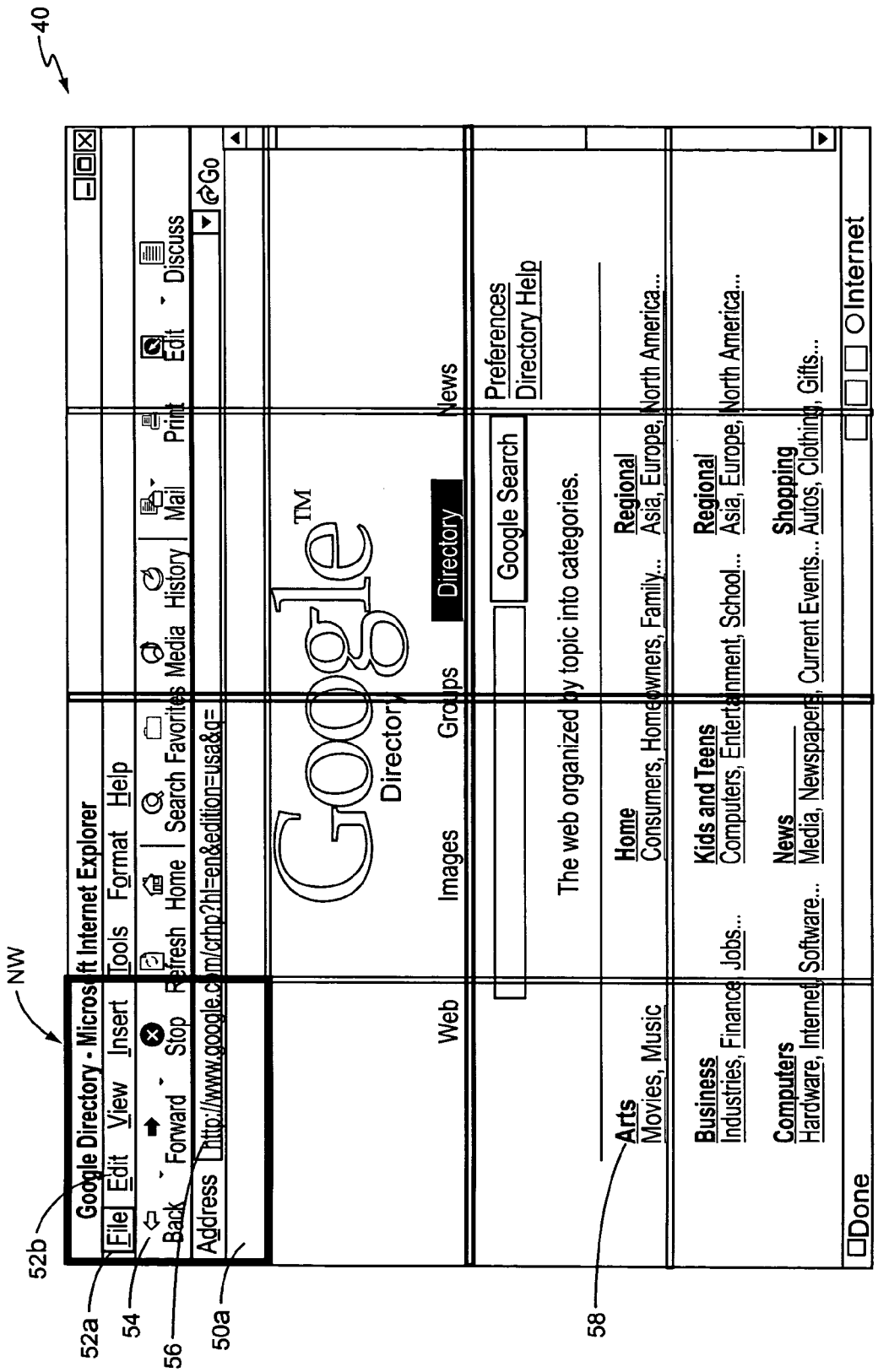
FIGS. 5A-5C further illustrate the method of navigating the display using one embodiment of the present invention.

When a sub-region is selected, subsequent user inputs will be directed to cycling between or selecting the desktop level objects that are within the scope of the selected sub-region. FIG. 5A illustrates such a selected sub-region 50a. As stated above, sub-regions typically contain one or more desktop level objects, such as drop down menus 52, control buttons 54, text fields 56, hyperlinks 58, and icons. Other controls known in the art, such as radio buttons (not shown), check boxes (not shown) list boxes (not shown), and combination boxes (not shown), may also be included. The present invention permits the user to cycle through each of these desktop level objects, and allows the user to select a particular desktop level object via the autoclick functionality. The response to the user selection or autoclick of a particular desktop level object will depend upon the type of control or object selected.

Figure 5B:
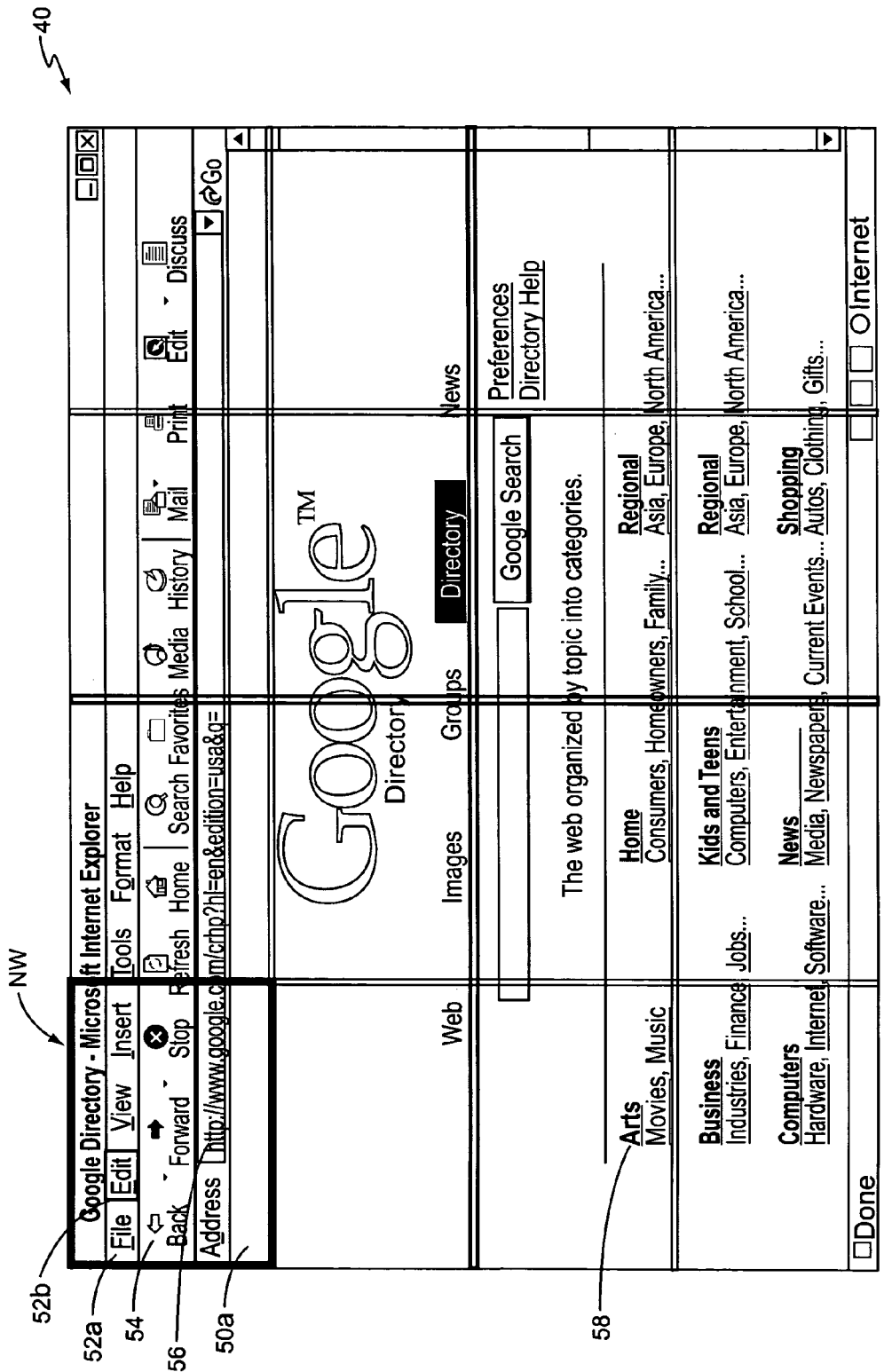
Figure 5C:
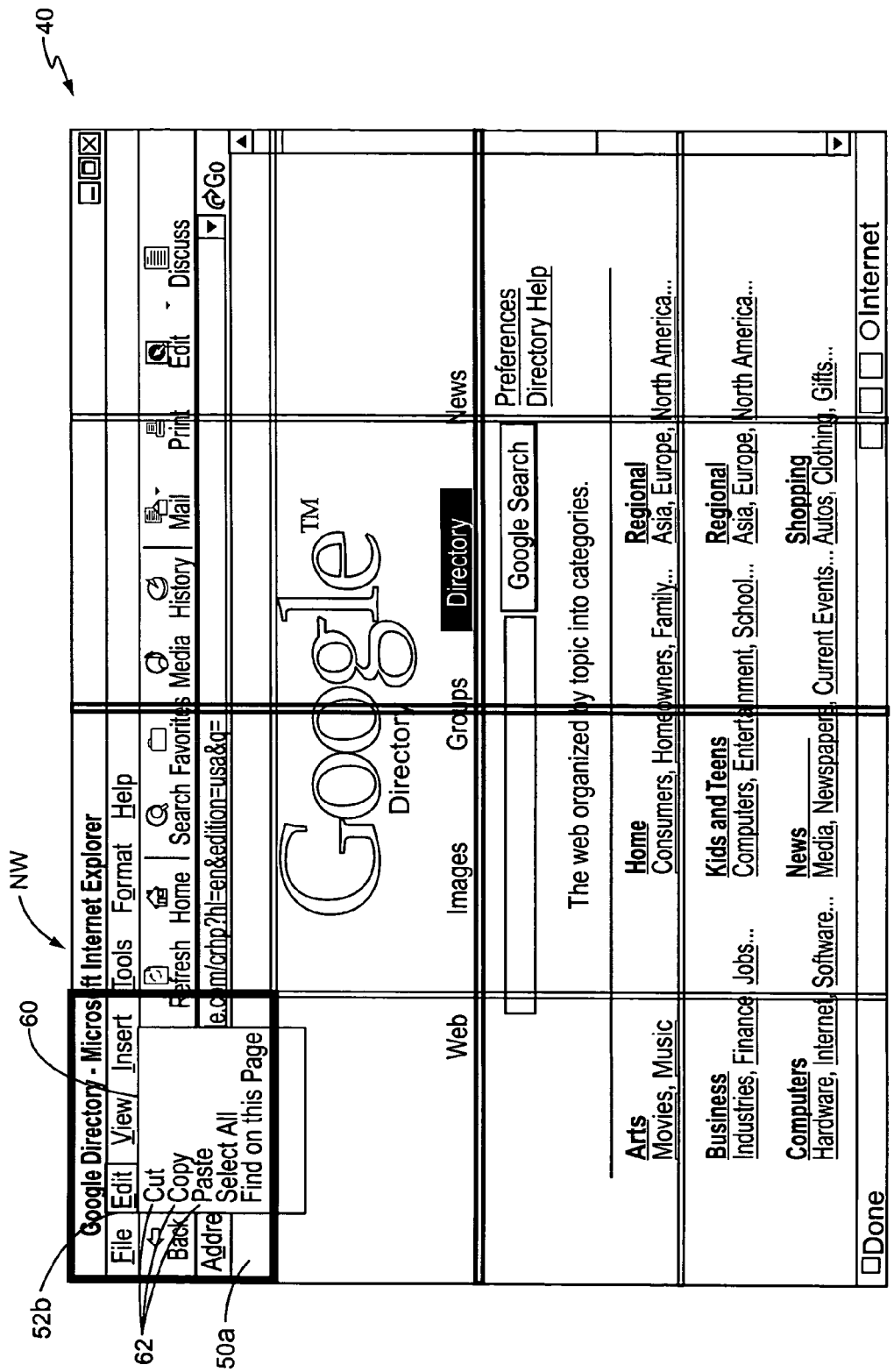

FIGS. 5A-5C illustrate cycling and automatic selection according to the present invention within the selected sub-region 50a. In FIG. 5A, the "File" menu item 52a has the current focus. To cycle to the "Edit" menu item 52b (FIG. 5B), the user simply exhales into one of the cells 18 before the timer expires. As above, controller 28 indicates the focus change to the user by highlighting the "Edit" menu item 52b. If the user wishes to select "Edit" 52b, the user simply dwells on the "Edit" menu item 52b until the predetermined timer expires. In response, controller 28 expands the "Edit" menu 60 (FIG. 5C), restarts the timer, and directs subsequent user input to "Edit" menu 60. The user may cycle through each of the menu items 62 as above, and autoclick on any particular item 62. This will result in controller 28 executing the functionality associated with the selected menu item 62. As stated above, if the selected menu item 62 includes a sub-menu, the sub-menu is given the focus. The user may then cycle through any sub-menu items, and autoclick to select a specific sub-menu item.

Just as the user may "drill down" through each level to select sub-regions and desktop level objects, the present invention also permits the user to "undo" selections and "back out" of selected levels to previous selected levels. In one embodiment, the present invention may be configured such that exhaling into a specific cell 18 automatically resets the interface to its initial state. For example, the user may reset the GUI 40 to the first level as shown in FIG. 3A by inhaling or exhaling into cell 18e regardless of the currently-selected level, and regardless of what region, sub-region, and desktop level object has the current focus. This would produce a special user input signal that would cause controller 28 to re-initialize the GUI 40 to the first level, and indicate that the NW region received the change in focus. The user would then be able to cycle through and select the regions, sub-regions, and desktop level objects as previously described.

In another embodiment, the present invention is configured to "back out" of a selected level to a previously selected level. Thus, a user who selected sub-region 50a in FIG. 4A by exhaling into one cell 18 would be able to "undo" or "back out" of the selection to the NW region by inhaling on the same cell 18. However, as stated above, inhaling into a cell 18 also permits a user to change the cycling direction. Thus, the present invention may be configured to distinguish between a user input signal to "back out" to a previous level, and a user input signal to change the cycling direction. More specifically, controller 28 keeps track of the number of full cycles executed by the user. One full cycle equates to one complete rotation around each region, sub-region, or set of desktop level objects. Once the user has completed at least one full cycle, inhaling on one of cells 18 will cause controller 28 to "back out" of the currently selected level (e.g., sub-region 50a in FIG. 4A) and return the GUI 40 to the previous level (e.g., region NW in FIG. 3A). Controller 28 would then indicate the region, sub-region, or desktop level object having the current focus, and the user may continue as detailed above. If, however, the user has not completed one complete cycle, inhaling through one of the cells 18 would simply change the cycling direction and move the focus (e.g., from clockwise to counterclockwise direction).

It should be noted that the preceding description illustrated exhaling to cycle and select, and inhaling to undo or back out. However, those skilled in the art will readily appreciate that this is not required, and that the process may be reversed. Users can alternatively inhale to cycle and select, and exhale to undo or back out. In fact, because the interface of the present invention is configurable, the user may customize functionality to the type of aspiration provided by the user.

Figure 6A:
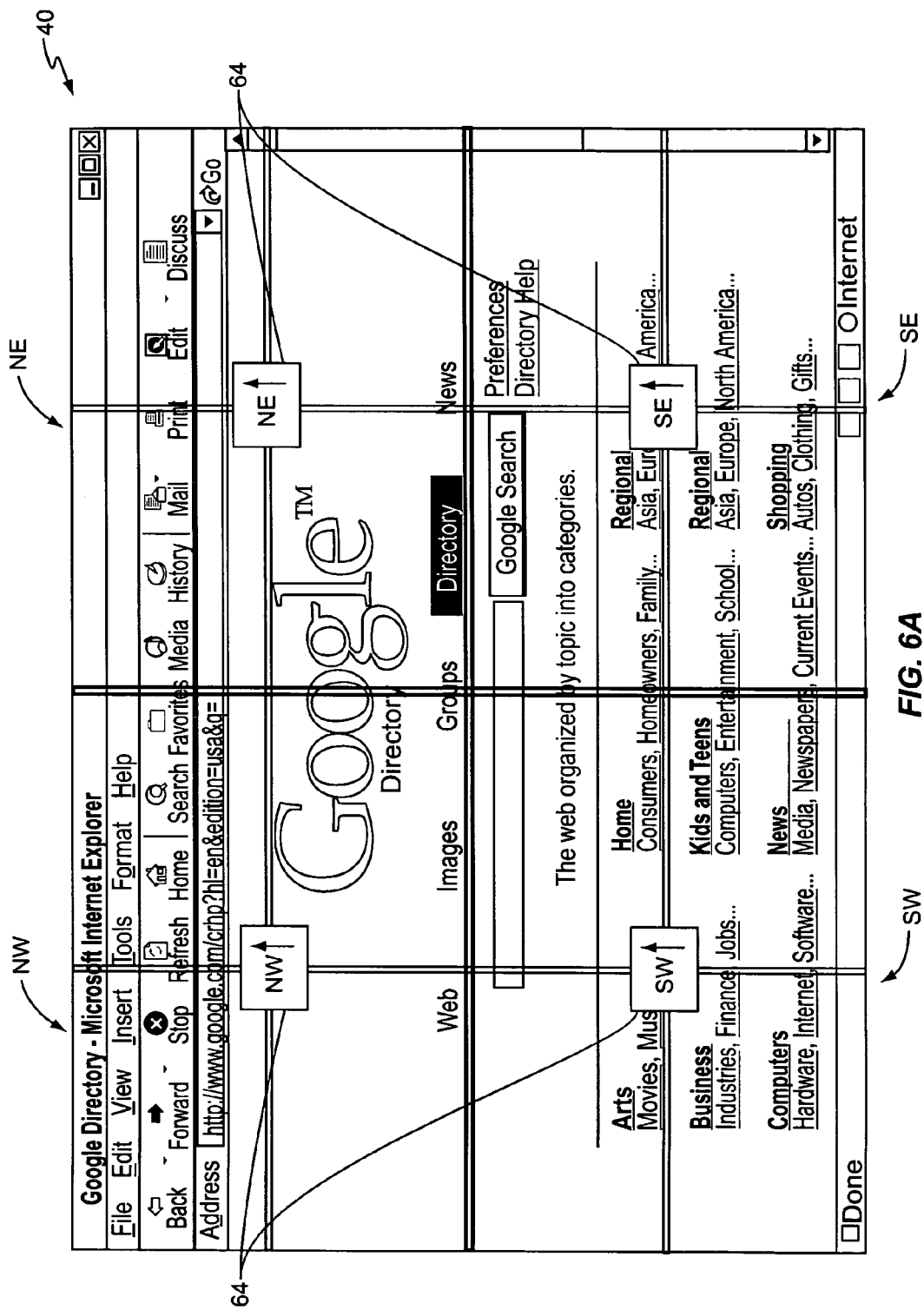
FIGS. 6A-6B illustrate some exemplary on-screen navigation aids that may be displayed to a user according to the present invention.

Additionally, it should also be noted that the hands-free input device 12 described so far has been a two-state device. Particularly, two-state input devices generate two input signals per cell 18 depending upon whether the user inhales or exhales. As seen in FIG. 6A, the present invention may overlay labels 64 over GUI 40 to aid the user in determining which cell 18 to choose and whether to inhale or exhale. For example, labels 64 in FIG. 6A indicate the NW, NE, SE, and SW regions. Similar labels could be placed on the input device 12 to identify which cell 18 corresponds to which region. Labels 64 may further include a directional arrow to indicate whether the user should inhale or exhale into the region's corresponding cell.

Figure 6B:
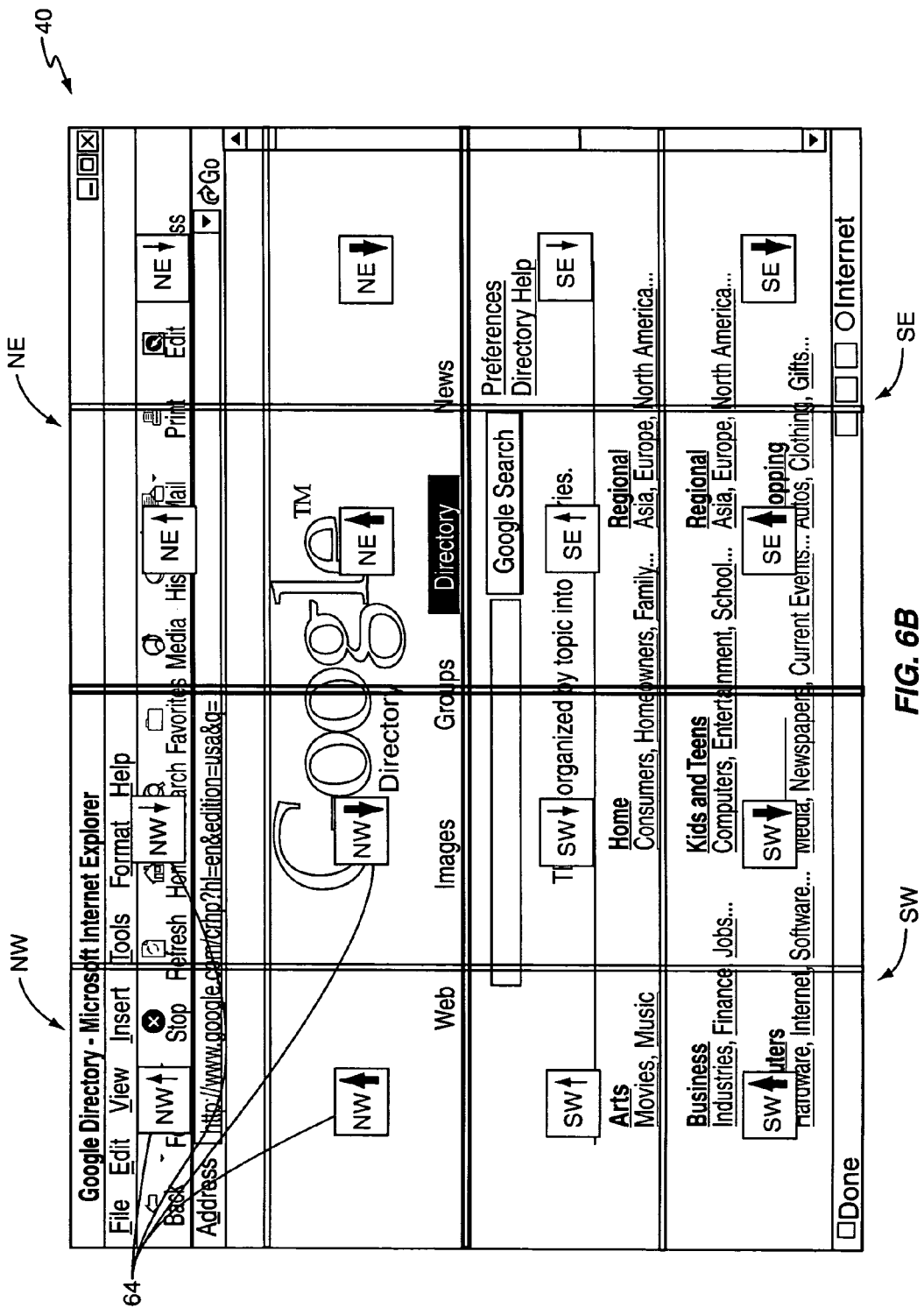

A more complex input device 12, such as a four-state device, may also be used with the present invention. In four-state devices, pressure sensors (not shown) are disposed in or near each of the cells 18 to determine the force with which the user aspirates through the cells 18. This permits the input device 12 to generate four signals per cell—two based on whether the user inhaled or exhaled, and two based on the force with which the user inhaled or exhaled. As seen in FIG. 6B, this permits the user to directly select a particular sub-region without first having to select a region. Like FIG. 6A, labels 64 may be overlaid on GUI 40 to assist the user in determining which cell 18 to use, whether to inhale or exhale, and the force with which to inhale or exhale. In this embodiment, directional arrows on labels 64 indicate whether to inhale or exhale, while the arrow thickness indicates the force with which the user should aspirate. Thinner arrows indicate a less forceful aspiration, while thicker arrows indicate a more forceful aspiration.

A four-state device may be useful, for example, in a "free-form" embodiment of the present invention, wherein the user moves a conventional cursor "freely" around the display. In one embodiment, a forceful exhale (i.e., a hard exhale) into one of the cells 18 moves the cursor vertically further and faster than a less forceful exhale (i.e., a soft exhale). That is, a hard exhale may move the cursor vertically a distance of ten pixels, while a soft exhale moves the cursor a distance of five pixels. This may be useful in using in software packages that provide Computer Aided Drawing (CAD) functionality, for example, or permit the user to play games.

In addition to permitting the user to navigate the Internet, the present invention also allows the user to interact with web pages and other software packages, such as QPOINTER KEYBOARD from COMMIDIO. QPOINTER KEYBOARD permits navigation of a display-based device using only a keyboard, and provides "object-tagging" functionality, in which helpful hints regarding an object are displayed to the user when a cursor is placed over the object.

Figure 7A:
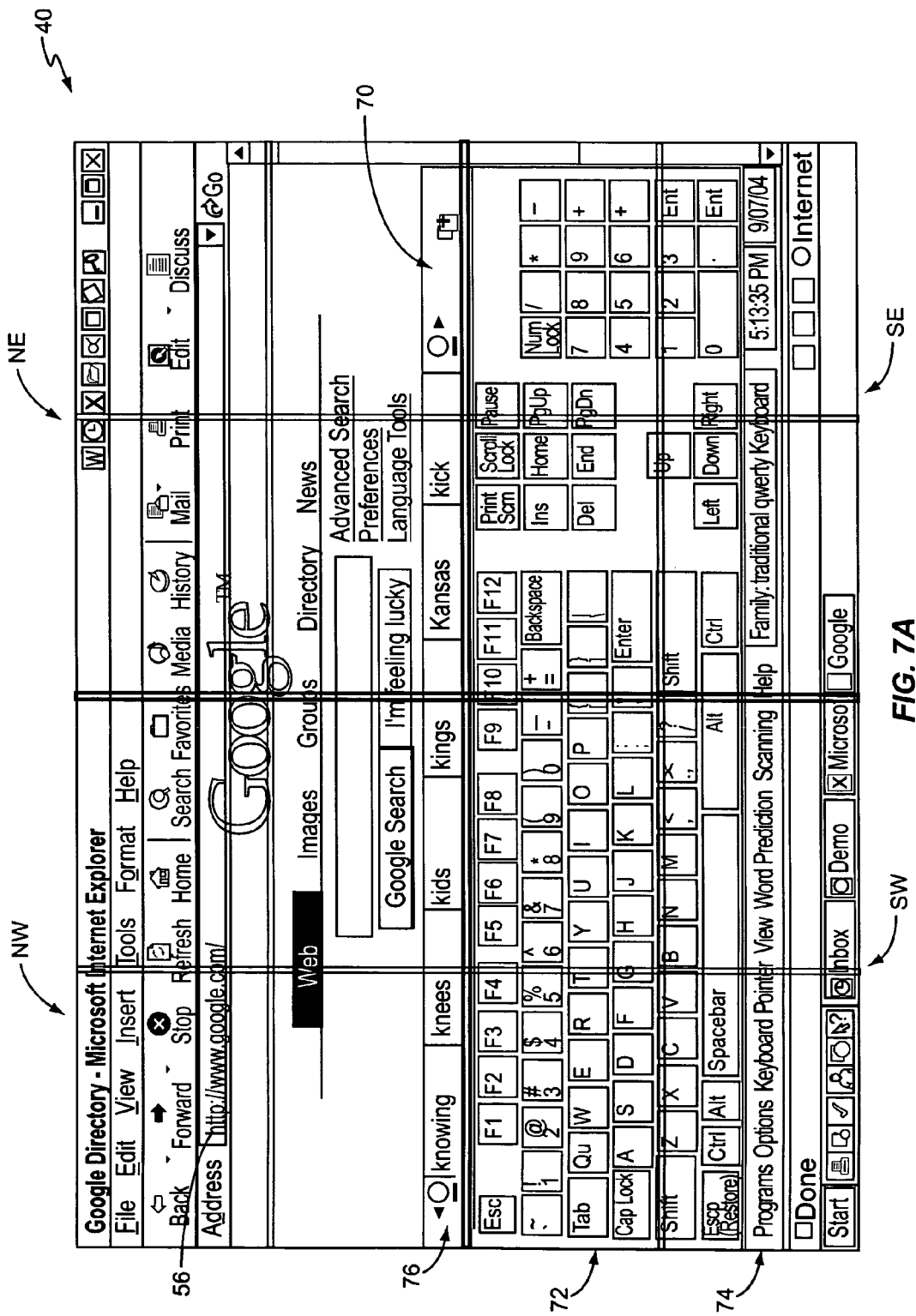
FIGS. 7A-7C illustrate some exemplary on-screen keyboards that may be displayed to a user according to the present invention.
Figure 9:
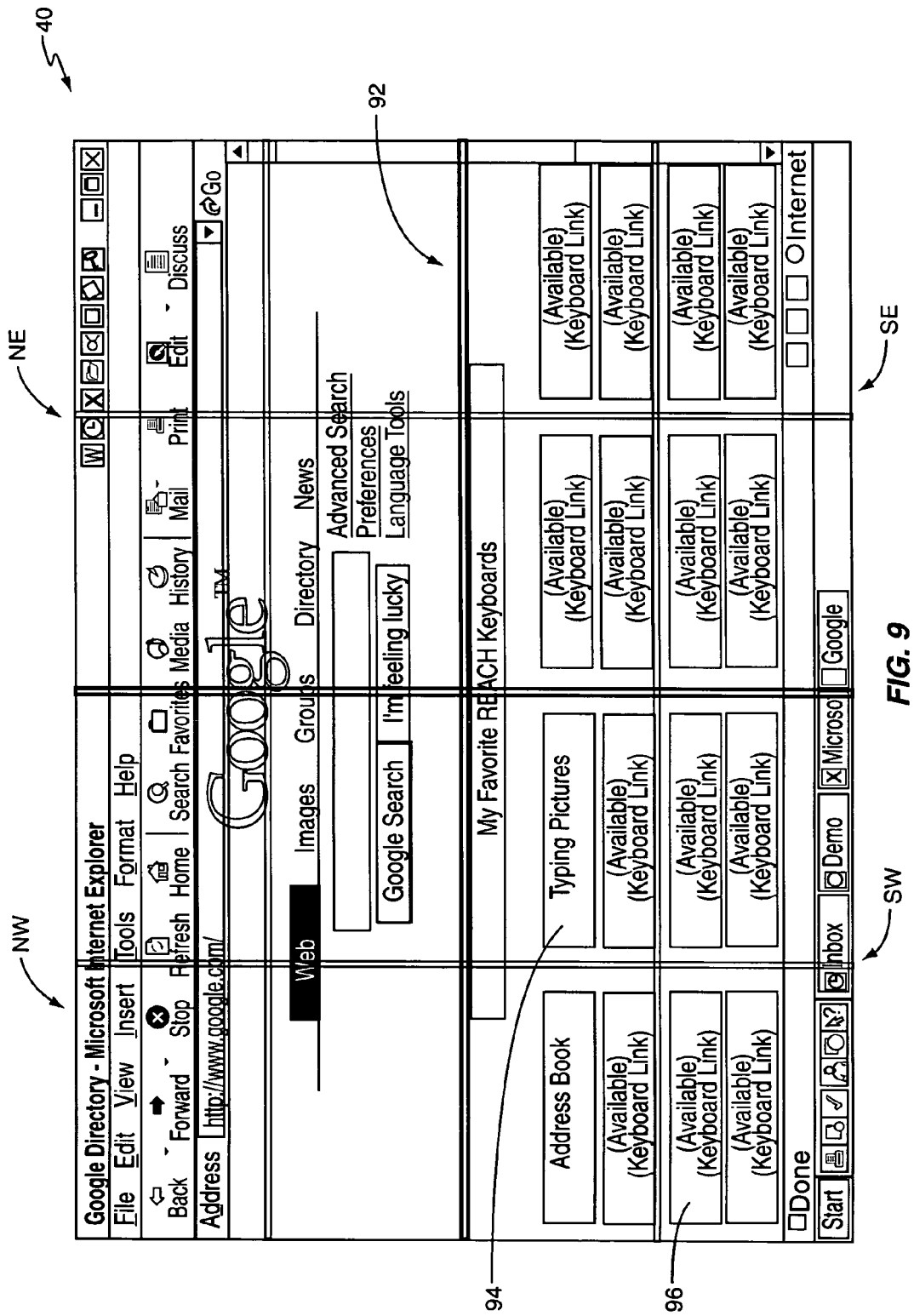
FIG. 9 illustrates an alternate on-screen keyboard layout that may be displayed to the user according to an alternate embodiment of the present invention.

FIGS. 7-9 illustrate another third-party application with which the present invention is compatible. Particularly, FIGS. 7-9 show an on-screen keyboard (OSK) application provided by APPLIED HUMAN FACTORS, INC. The present invention may interact with such conventional OSKs to allow the user to select keys or other controls. In FIG. 7A, OSK 70 comprises a full compliment of keys 72 typically available with known keyboards. OSK 70 also includes menu section 74 with which the user may invoke frequently used programs, and a word-prediction section 76 to allow the user to build complete sentences. When OSK 70 is visible on the display, it may overlay the lower two regions SW and SE. However, the user may control the transparency/opacity of OSK 70, or hide it altogether, simply by aspirating through one of cells 18. Varying the transparency of OSK 70 permits the user to navigate and use the OSK 70 while still allowing the user to see the underlying GUI 40.

Figure 7B:
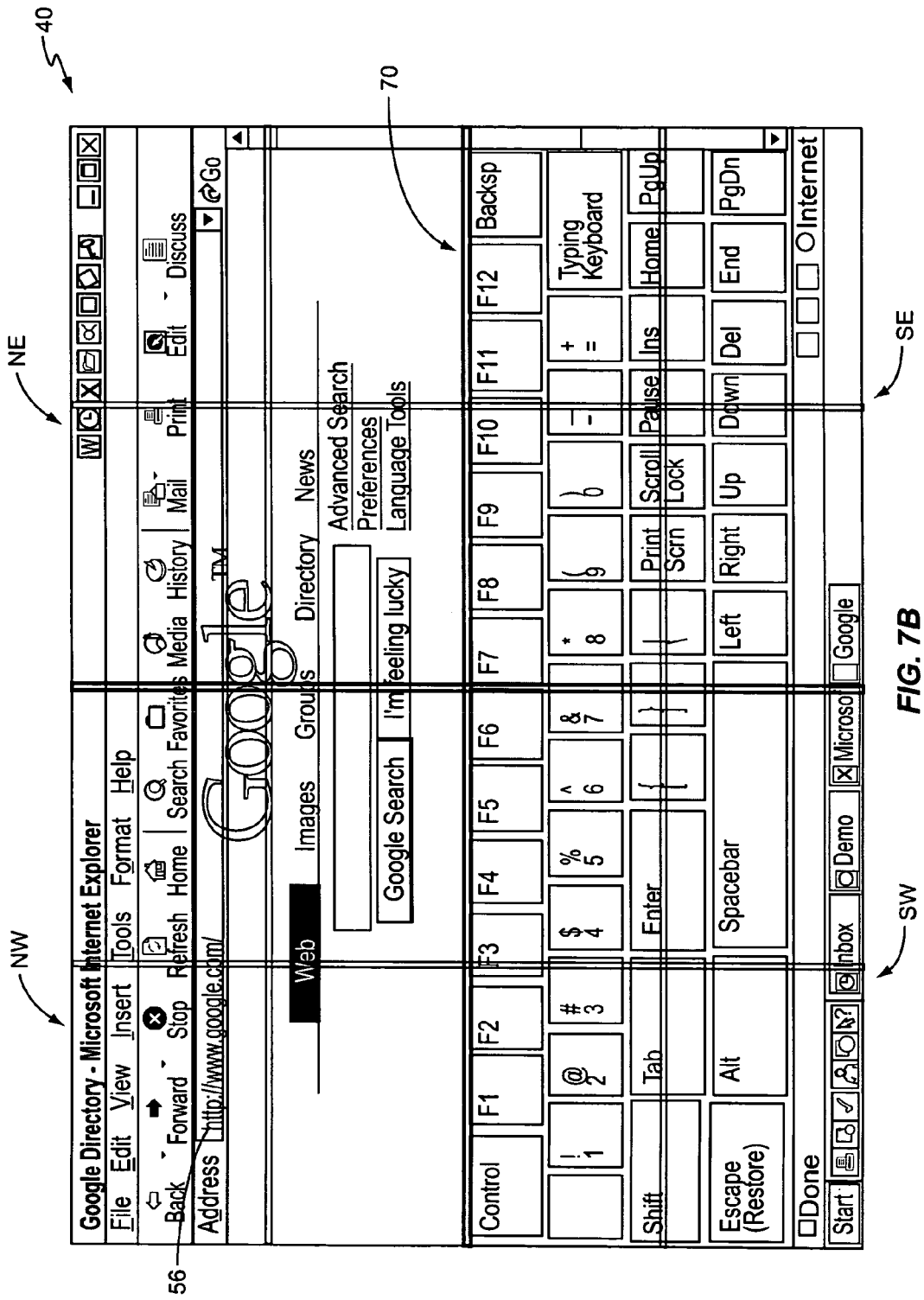
Figure 7C:
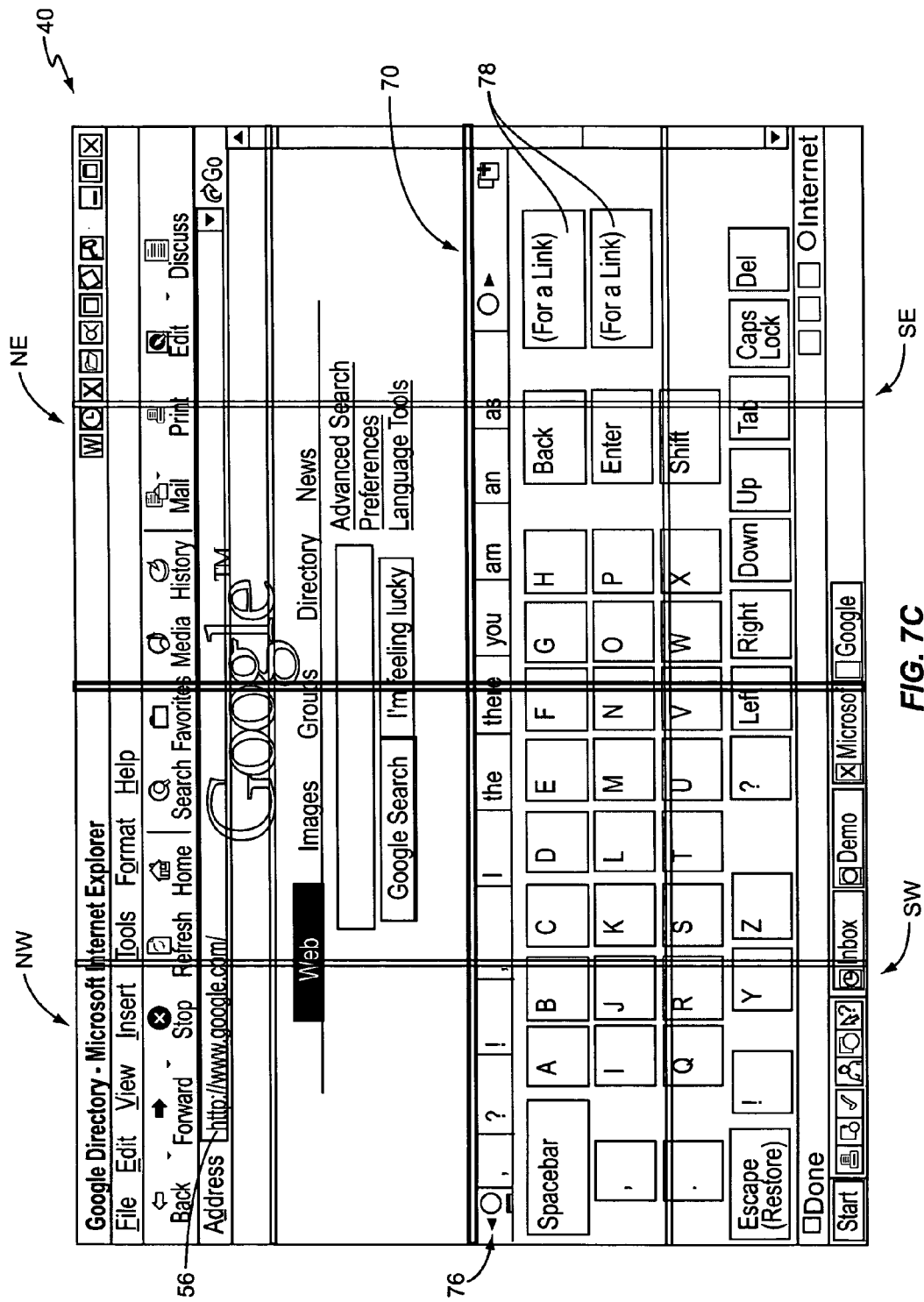
Figure 8A:
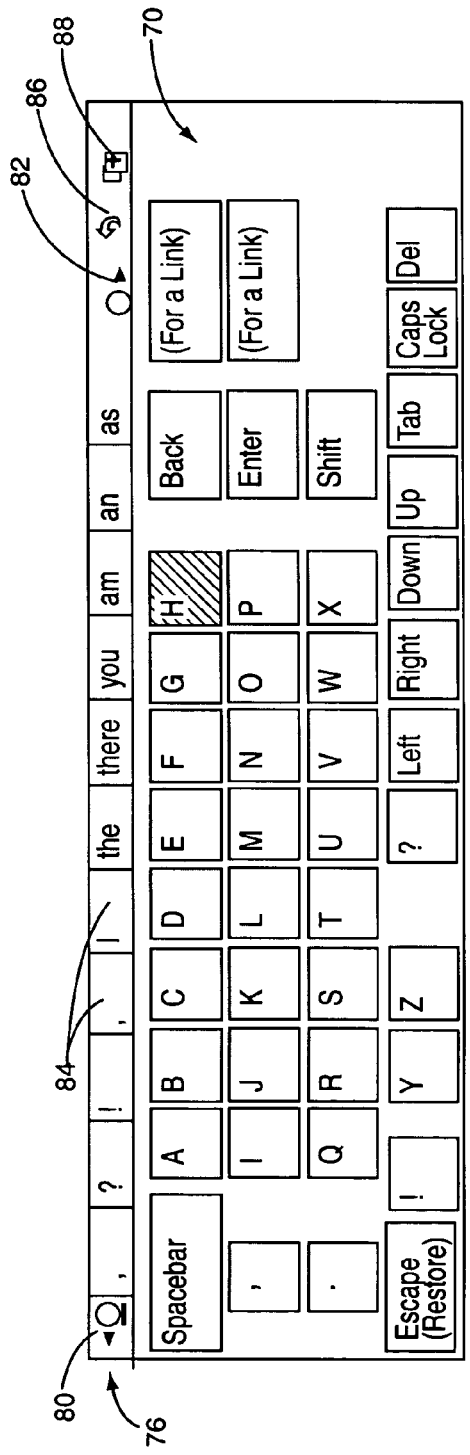
FIGS. 8A-8E illustrate a possible function executed according to one embodiment of the present invention.
Figure 8B:
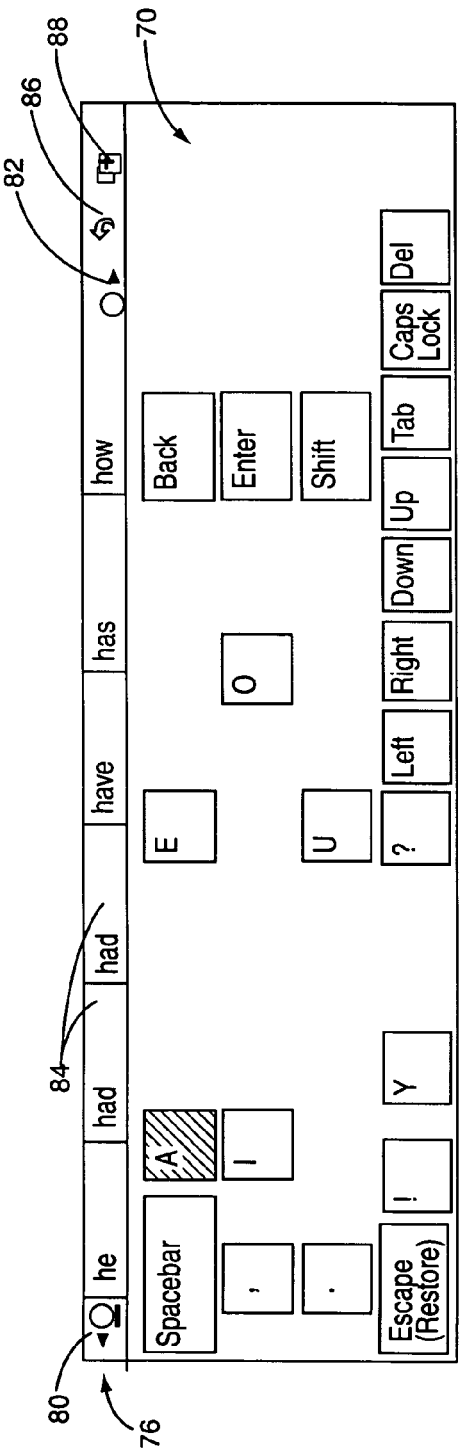
Figure 8C:
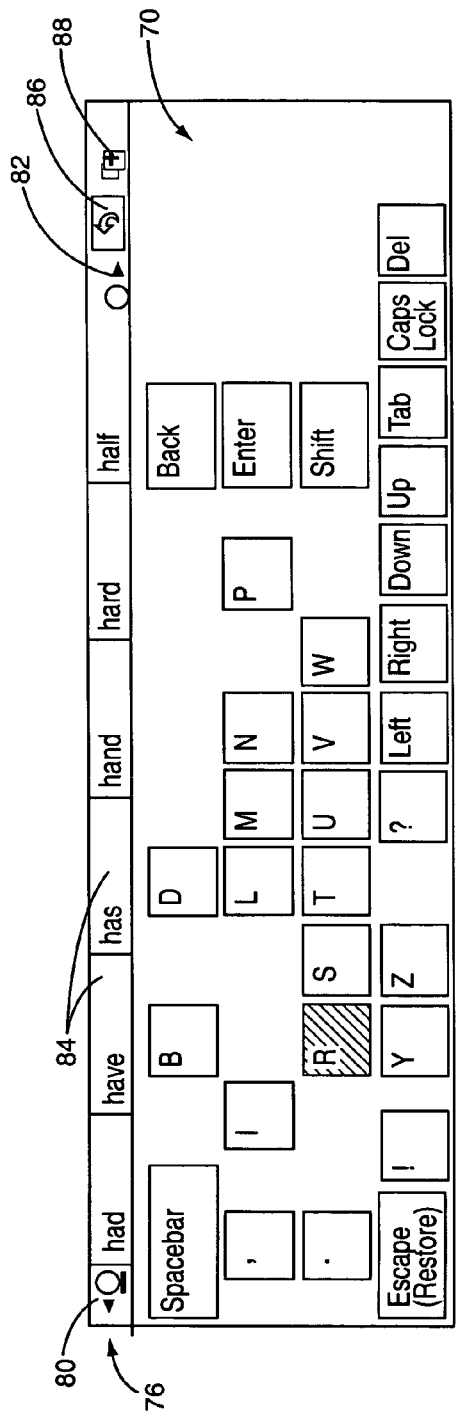
Figure 8D:
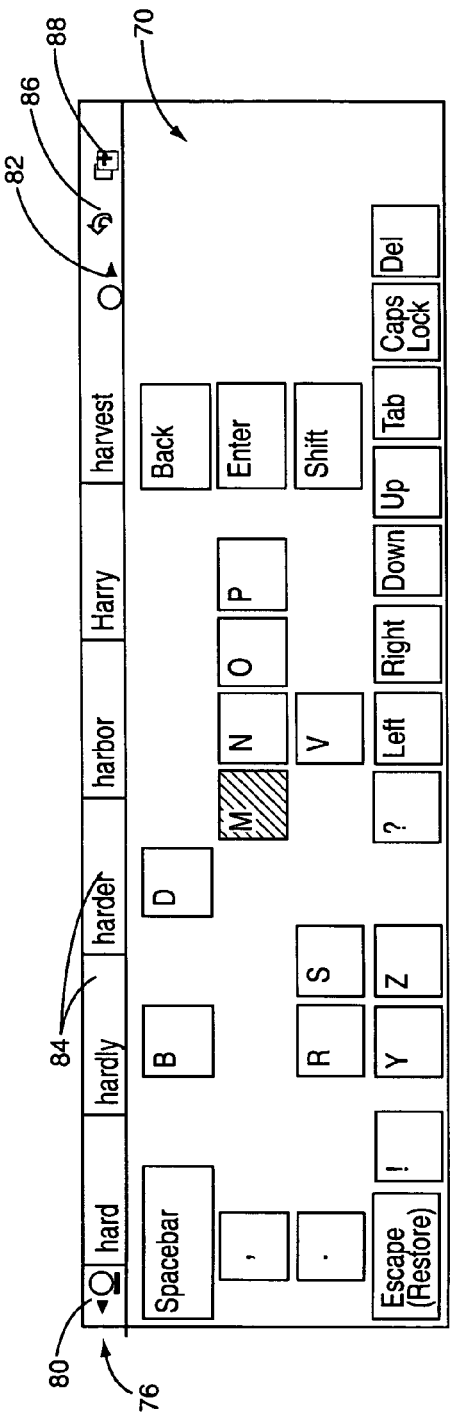
Figure 8E:
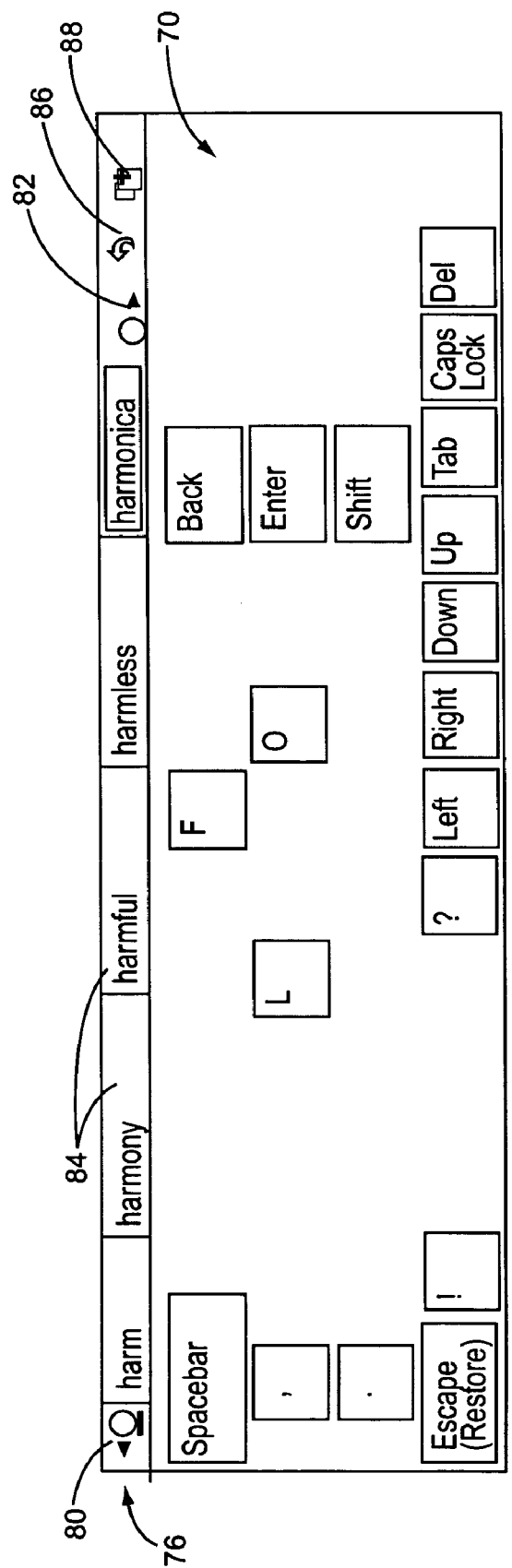

However, the present invention does not require displaying a full-size on-screen OSK 70 such as the one shown in FIG. 7A. Alternatively, the present invention may be configured to display OSK 70 in portions as seen in FIGS. 7B-7C. In this embodiment, the present invention partitions OSK 70 into groupings of selectable objects having one or more keys 72. In FIG. 7B, for example, only the number keys, the control keys used in editing a document (e.g., PgUp, PgDn, Home, End, Ins, Backsp, Shift, etc.), and the function keys (e.g., Control, F1-F12, Escape, etc.) are displayed. FIG. 7C displays the alphabetical keys, punctuation keys, and control keys (e.g., Escape, Enter, Shift, Del, Caps Lock, etc.). Displaying OSK 70 in portions frees the user from a conventional QWERTY arrangement, and allows the user to customize the position of keys 72 as desired. It also permits the user to add special purpose controls 78. Controls 78 may be preconfigured to contain a link to a designated website, launch a program, or execute specific functionality within the program, such as a spell checker, for example.

The user may cycle through the various available OSK portions simply by aspirating through one of the cells 18. For example, exhaling through cell 18*e* a first time may cause the full-size OSK to be displayed on-screen, as in FIG. 7A. Successive exhales through cell 18*e* prior to the expiration of the predetermined timer would cause successive portions of the OSK 70 to be displayed, as in FIGS. 7B and 7C. Still, subsequent exhales through cell 18*e* might hide OSK 70 altogether, while successive inhales through cell 18*e* may allow the user to alter the placement on display 26 and/or the transparency/opacity of OSK 70. As before, dwelling on any one OSK until the expiration of the predetermined timer may select that particular OSK.

FIGS. 8A-8E illustrate how a user may edit documents or letters by building words using the selected OSK 70. More specifically, the user may build words and control the interface by cycling to the desired key 72 or control button and autoclicking. As each letter is selected, controller 28 searches a database dictionary and displays possible matching words in control boxes 84. The user can scroll backwards and forwards through the words by selecting control buttons 80 or 82, or refresh (i.e., start again) by selecting control button 86. The user may add new words to the dictionary database by entering the letters that spell the word and selecting control button 88.

The example of FIGS. 8A-8E illustrates how the user might build the word "harmonica." The user aspirates through cells 18 to cycle to the "h" key in keyboard 70 and autoclicks. Controller 28 then displays frequently used words beginning with the letter "h" gleaned from the dictionary database. Controller 28 might also hide those keys containing letters that cannot be used directly after the letter "h." In FIG. 8B, for example, only vowels may appear directly after the letter "h," and thus, the interface displays those keys 72 associated with vowels. Keys 72 associated with consonants, for example, are not displayed to the user. Each successive key 72 selection results in a better-defined, narrower word list in word-section 76. Once the desired word appears in the word-section 76, the user cycles to, and autoclicks, to select the desired word. Controller 28 would then insert the selected word, which in this case is "harmonica," into the current document.

It should be noted that when OSK 70 is displayed, controller 28 provides substantially simultaneous focus to both OSK 70 and an application object, such as a text field, on GUI 40. This permits the user to cycle to and select a desired key 72 from OSK 70 for entry into the selected field on GUI 40, or create and/or edit documents using third party software such as MICROSOFT WORD, for example.

As seen in FIG. 9, the present invention also permits users to interact with OSK 70 having a bank of controls 92. Bank 92 may include, for example, control buttons 94 and 96 that act as "quick-links" to a predetermined webpage or other functionality. As above, the user simply aspirates through cells 18 to cycle to the desired control, and autoclicks to select.

Figure 10:
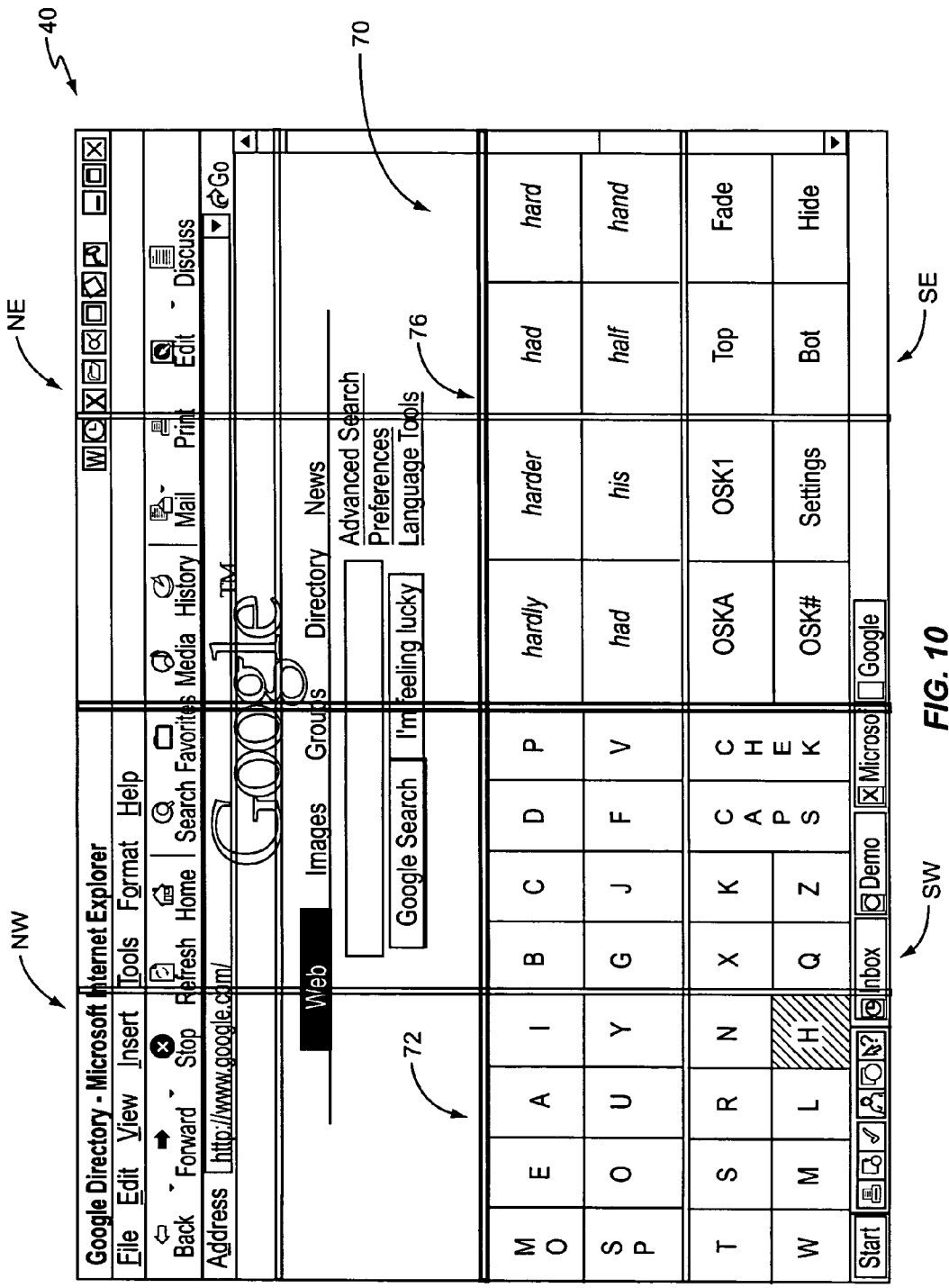
FIG. 10 illustrates another alternate on-screen keyboard layout that may be displayed to the user according to an alternate embodiment of the present invention.

FIG. 10 illustrates an alternate embodiment wherein OSK 70 integrates both keyboard and word prediction functionality. As in the previous embodiments, the position of OSK 70, as well as its key configuration and opacity, are configurable by the user. In addition, OSK 70 of FIG. 10 may also be displayed in portions, each having their own set of keys 72. In FIG. 10, OSK 70 includes all 26 alphabetical keys and some additional keys that provide special functionality. However, it should be understood that the keys 72 on OSK 70 may have any configuration desired, and that alternate OSKs may include numeric keys and/or punctuation keys in place of or in addition to the keys 72 shown herein.

The MODE ("MO") key provides functionality similar to that of cell 18*e* in that it permits a user to cycle through the various OSKs 70. Alternatively, the user may also directly select the particular OSK 70 by cycling to and autoclicking one of the "OSK" keys. The SPACE ("SP") key may be configured to enter a space, while the spell check ("CHEK") key may launch a spell checker. The Caps ("CAPS") key may capitalize a character. It should be noted that the keys on the OSK 70 might be configured to automatically provide automatic entry of space and/or capitalization of words as desired. The "Settings" key may permit the user to modify the configuration of the keyboard, and the "Top," "Bot," and "Fade" keys allow the user to set the position and control the transparency/opacity of OSK 70. The "Hide" key permits the user to hide the OSK from the GUI.

As in the previous embodiment, OSK 70 of FIG. 10 may include a word prediction section. As the user selects a key 72, a list of possible or commonly used words will be displayed to the user. With each subsequent selection of a key 72, the words may be updated. Word prediction minimizes the number of keys 72 that a user must select in order to create full sentences in a document, for example.

Figure 12:
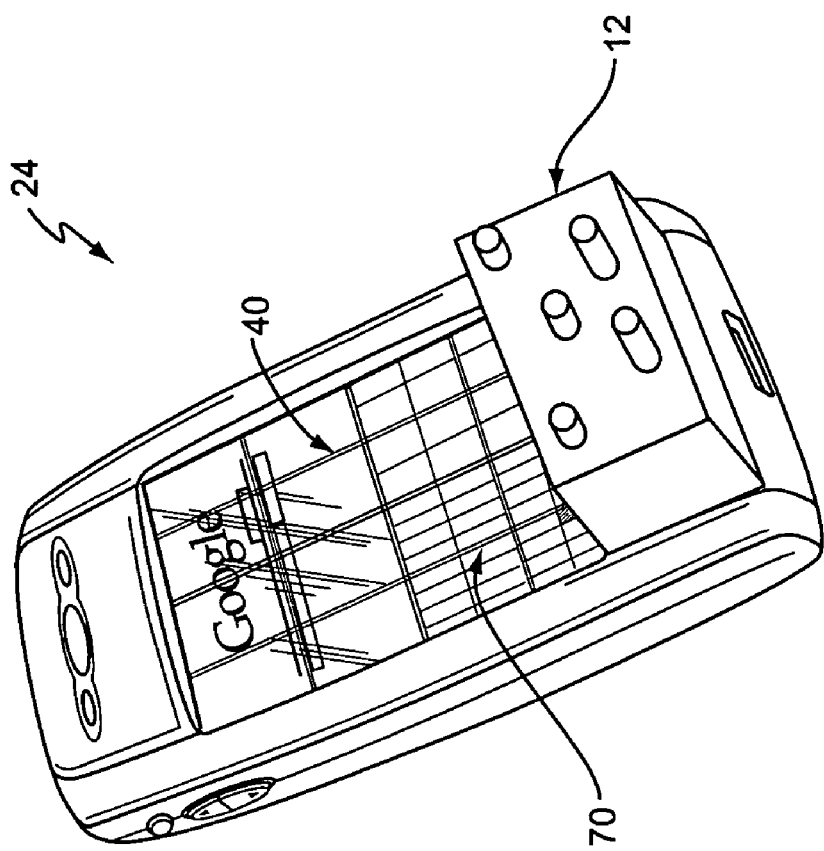
FIG. 12 illustrates one embodiment of the present invention as used with a Personal Digital Assistant (PDA).

The description has thus far described device 24 in terms of a desktop computer. However, it should be noted that the present invention might also interact with other, more portable devices, such as a Personal Digital Assistant (PDA) shown in FIG. 12. In FIG. 12, device 24, embodied as a PDA, includes a user input device 12, a GUI 40, and an OSK 70 overlaying a bottom portion of GUI 40. A grid, such as the one shown in FIGS. 3-5, is overlaid on the GUI 40 of PDA. Cycling and autoclicking permits the user to navigate and select various regions, sub-regions, and/or objects as previously described.

Figure 11:
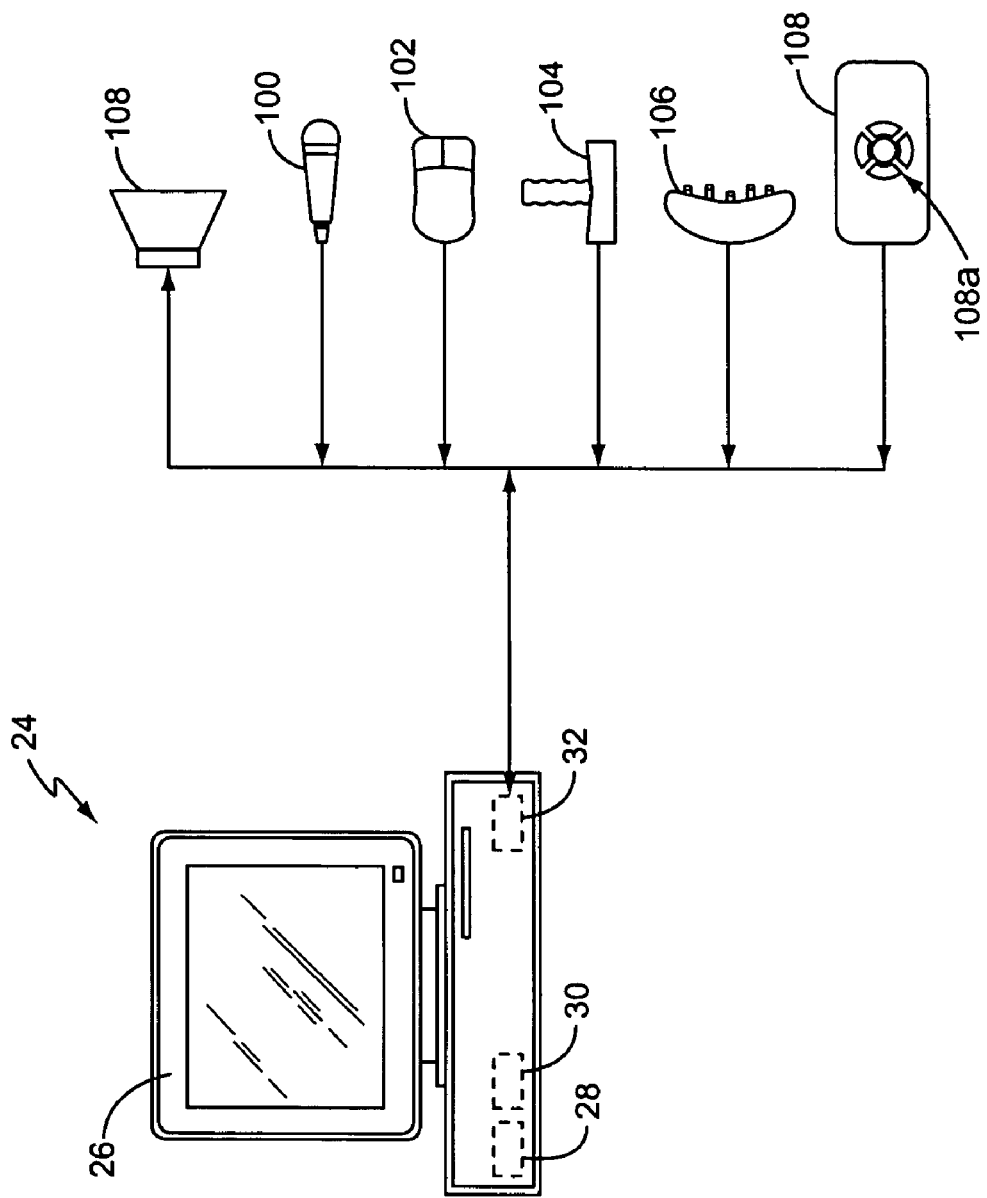
FIG. 11 illustrates alternative user input devices that may be used with the present invention.

In addition to the user input device 12 shown in FIGS. 1 and 2, the interface of the present invention may also receive user input from alternate user input devices, such as those shown in FIG. 11. For example, the user may use a microphone 100 to generate user input signals. In this case, the interface of the present invention would comprise a voice-recognition engine as is known in the art. The user would cycle through regions, sub-regions, and desktop level controls, for example, by speaking predetermined commands into microphone 100. Silence for a predetermined amount of time without speaking a recognized command would result in an autoclick.

Alternatively, the user may wish to use a mouse 102 or a joystick 104. These input devices may be preferable, for example, for users who lack fine motor skills, but retain some gross motor control. However, non-disabled persons could use these input devices as well. In "freeform" embodiment, the interface of the present invention may be configured to reposition an on-screen pointer a specified distance (e.g., a certain number of pixels) in response to the movement of mouse 102 or joystick 104. In other embodiments, moving the mouse 102 or joystick 104 would permit the user to cycle through the regions, sub-regions and desktop level controls. As in the previous embodiments, the user would simply not move the mouse 102 or joystick 104 to execute an autoclick.

In yet another embodiment, an "Electric Skin Resistance" (ESR) input device 106 generates input signals responsive to the user's touch instead of the user's aspiration. In this embodiment, cells 18 may be constructed of a conductive metal or metal alloy, and would generate a signal whenever the user's lips made contact with cells 18. For example, contacting the user's upper lip to a top half of cell 18 would generate a first input signal, while touching the user's bottom lip to a lower half of cell 18 would generate a second input signal. This would permit the user to cycle through the regions, sub-regions, and desktop level controls in clockwise and counter-clockwise directions. Of course, not touching any of cells 18 for a predetermined amount of time would result in an autoclick.

In another embodiment, a remote control device 108 may be used to generate input signals responsive to the user's actuation of one or more buttons disposed in a cluster 108a on remote control device 108. As seen in FIG. 11, remote control device 108 includes four buttons surrounding a middle button. For clarity, cluster 108a is illustrated to resemble the buttons on a TV remote, for example, that controls a TV, VCR, DVD, or other device. However, those skilled in the art will appreciate that the controls in cluster 108a may be positioned or sized as desired.

In this embodiment, a television or other display device may be used to display GUI 40 indicating selections relating to a nurse-call system, for example. The regions NE, NW, SE, and SW may be marked with informative labels, such as "TEMPERATURE," "TV," "LIGHTS," and "BED." Using the buttons in cluster 108a, the user could cycle to and autoclick on one or more of these four regions to access the subregions, and/or deeper levels. The various levels could be configured to provide functionality specific to the particular selected region. For example, a user, upon selection of the "TEMPERATURE" region, might be presented with four subregions, each containing labels such as "TEMP COOLER," "TEMP WARMER," FAN FASTER," and "FAN SLOWER." Selection of one of these four subregions would permit the user to control the temperature. Deeper levels might provide even more granular control. Likewise, the user could also control "TV" functionality (e.g., volume, channel selection), lights, and/or the positioning of a bed simply by actuating on or more of the buttons in cluster 108a. The middle button might permit direct selection of a region, sub-region, or other on-screen object, or might be preconfigured to automatically dial 9-1-1, a nurse, or other medical professional as needed.

Of course, any of the devices shown in the figures may be used to generate user input signals to the interface of the present invention for use in other applications as well. In one embodiment, for example, the interface of the present invention overlays a television screen. The user might navigate the interface to select channels, enter data (e.g., for web-based television applications), or surf the Internet.

In another embodiment of the present invention, controller 28 may generate input signals responsive to the user's thoughts. This is known as neuro-navigation. In this embodiment, a small chip comprising circuitry, such as the BRAIN-GATE chip manufactured by CYBERKINETICS INC., or a web implant system, such as the system manufactured by NEUROLINK, may be implanted in a user's body. Using these chips and/or systems, or others like them, the user might simply "think" commands that are then transmitted from the implant to computing device 24. Controller 28 may translate these thought commands into movements and actions on the interface of the present invention. For example, a user may cycle around GUI 40 simply by thinking, "cycle clockwise," or "cycle counterclockwise." The user may select a region, sub-region, or desktop level object by thinking the command "autoclick," for example, or pausing on a selected region, sub-region, or desktop level command without thinking any command for a predetermined period.

These implantable neural interfaces, and others like them, could provide reliable and fast output signals to computing device 24 operating according to the present invention. However, the present invention is in no way limited merely for use in navigating the Internet, creating, and editing documents, or other tasks typically performed using personal computing devices. As research continues and these devices and systems mature, other commands and methods of controlling the interface of the present invention will become possible. For example, further developments could generate signals to allow users to control other types of devices, such as environmental controls, medical devices designed to power their own limbs, and robotic equipment such as wheelchairs. The present invention would allow users to control and/or operate these types of devices according to the generated input signals.

In another embodiment, surgeons or other medical care professionals could utilize the present invention to select and/or manipulate medical instruments to perform remote surgery. In this embodiment, GUI 40 may display one or more medical instruments that the surgeon would cycle to and autoclick to select. Progressively deeper levels might display predetermined actions the surgeon might to perform with the selected instrument. Alternatively, the surgeon could use his or her hands to control an existing device to perform the surgery from a remote location, while using the interface of the present invention (via, for example, hands-free device 12) to control one or more on-site cameras to provide various angles for video feedback, or to access medical information or assistance. Those skilled in the art would easily be able to imagine many such other embodiments.

Figure 13:
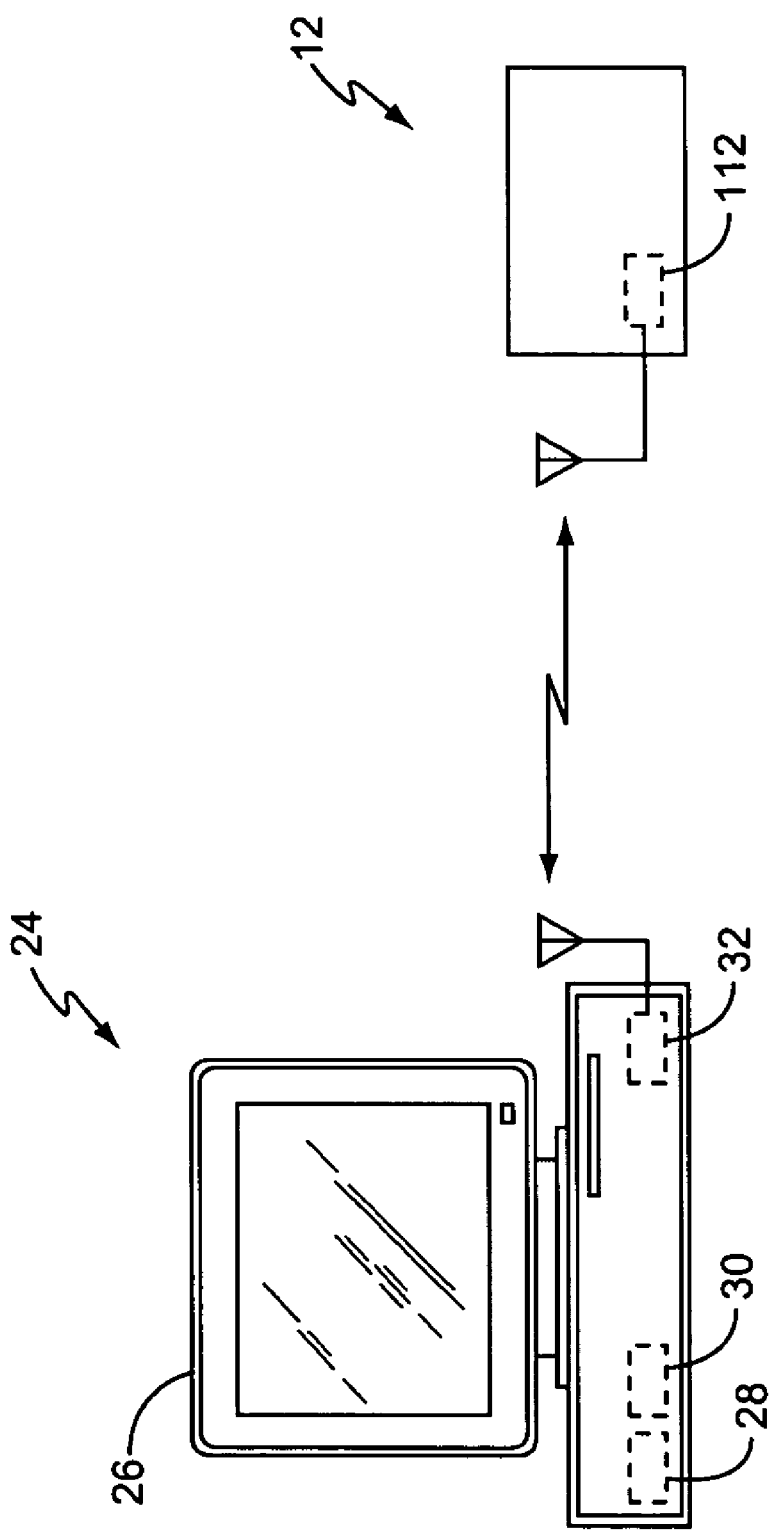
FIG. 13 illustrates a wireless embodiment of the present invention.

Irrespective of the type of user input device or implant, however, the interface of the present invention permits the user to cycle and autoclick. Additionally, the interface of the present invention is useful for both physically-challenged persons as well as non-physically-challenged persons. The user is always informed of the results of the input signals via on-screen and/or auditory feedback through speaker 110. Further, the present invention does not require that a particular user input device transmit input signals via cable 22, but rather, also contemplates the use of a wireless interface, such as the one shown in FIG. 13. In this embodiment, input device 12 comprises a wireless transceiver 112, such as a BLUE-TOOTH or infrared transceiver that communicates with corresponding wireless port 32 on computing device 24.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of navigating a graphical user interface associated with a user application, the method comprising:
    executing a third-party application having a graphical user interface on a computing device; and
    executing a navigation application on the computing device such that the navigation application operates independently of the third-party application, the navigation application being configured to:
        overlay a grid on the graphical user interface of the third-party application to partition the graphical user interface into a plurality of regions;

set a focus to one of the regions;
receive user input signals from a hands-free user input device;
change the focus between the regions responsive to receiving the user input signals; and
automatically select the region having the focus after a predetermined period of time in which no user input signals are received from the hands-free user input device.

2. The method of claim 1 wherein the navigation application is further configured to overlay a grid on the selected region to further partition the selected region into a plurality of sub-regions.

3. The method of claim 2 wherein the navigation application is further configured to set the focus to one of the sub-regions.

4. The method of claim 3 wherein the navigation application is further configured to change the focus between the sub-regions responsive to user input signals.

5. The method of claim 4 wherein the navigation application is further configured to automatically select the sub-region having the focus after a predetermined period of time in which no user input signals are received.

6. The method of claim 5 wherein the selected sub-region includes a plurality of graphical user interface objects, and wherein the navigation application is further configured to set the focus to an object in the selected sub-region.

7. The method of claim 6 wherein the navigation application is further configured to change the focus between the objects responsive to user input signals.

8. The method of claim 7 wherein the navigation application is further configured to automatically select the object having the focus after a predetermined period of time in which no user input signals are received.

9. The method of claim 8 wherein the navigation application is further configured to restart the predetermined timer after each selection.

10. The method of claim 1 wherein the navigation application is further configured to communicate signals to the third-party application to control the third-party application to change focus and to automatically select the region having the focus.

11. The method of claim 10 wherein the third-party application comprises an operating system executing on the computing device that controls the execution of the navigation application.

12. The method of claim 10 further comprising executing an operating system on the computing device to control the operation of the third-party application and the navigation application.

13. The method of claim 1 wherein the navigation application is further configured to automatically select a representation of a keyboard displayed on a display.

14. The method of claim 13 wherein the representation of a keyboard comprises a subset of the keys available with a keyboard.

15. The method of claim 1 wherein the navigation application is further configured to indicate to the user which region is receiving the focus when the navigation application changes the focus between the regions.

16. The method of claim 1 further comprising the navigation application generating the user input signals responsive to the user's aspirations.

17. A method of navigating a graphical user interface associated with a third-party application, the method comprising:
executing a third-party application having a graphical user interface on a computing device; and
executing a navigation application on the computing device such that the navigation application operates independently of the third-party application, the navigation application being configured to:
receive user input signals from a hands-free user input device;
overlay a grid on the graphical user interface of the third-party application to partition the graphical user interface into a plurality of hierarchical levels, each hierarchical level including one or more selectable objects;
set a focus to one of the selectable objects within the scope of a first level;
automatically select the object having the focus after a predetermined period of time in which no user input signals are received from the hands-free user input device; and
transition from the first level to a second level.

18. The method of claim 17 wherein the navigation application is further configured to set the focus to one of the selectable objects within the scope of the second level.

19. The method of claim 18 wherein the navigation application is further configured to automatically transition from the second level to a third level after a predetermined period of time in which no user input signals are received.

20. The method of claim 17 wherein the navigation application is further configured to navigate between the one or more selectable objects responsive to user input signals.

21. The method of claim 20 wherein the navigation application is further configured to navigate between the one or more selectable objects by changing the focus between the one or more selectable objects if the user input signals are generated before the predetermined period of time expires.

22. The method of claim 17 wherein the navigation application is configured to partition the first level into one or more regions.

23. The method of claim 22 wherein the regions are selectable objects in the first level.

24. The method of claim 22 wherein the grid overlaid on the graphical user interface defines the boundaries of the regions in the first level.

25. The method of claim 22 wherein the navigation application is further configured to partition a second level below said first level into regions, and wherein the regions in the second level form sub-regions within the regions at the first level.

26. The method of claim 25 wherein the grid overlaid on the graphical user interface defines the boundaries of the sub-regions in the second level.

27. The method of claim 25 wherein the sub-regions are selectable objects in the second level.

28. The method of claim 25 further including a third level having a plurality of desktop level objects.

29. The method of claim 28 wherein subsets of the desktop level objects are included in each sub-region of the second level.

30. The method of claim 17 wherein the navigation application is further configured to transition back to the first level from the second level responsive to user input.

31. The method of claim 17 wherein the navigation application is further configured to generate user input responsive to the user's aspirations.

32. An electronic device comprising:
a display to display a graphical user interface of a third-party application;
a hands-free user input device to generate user input signals; and a controller communicatively connected to the display and to the hands-free user input device, and configured to execute the third-party application to display the graphical user interface, and to execute an independent navigation application to:
  receive the user input signals generated by the hands-free user input device;
  overlay a grid on the graphical user interface of the third-party application to partition the graphical user interface into a plurality of objects;
  set a focus to one of the objects;
  change the focus between the objects responsive to user input signals received from the hands-free user input device; and
  automatically select the object having the focus after a predetermined period of time in which no user input signals are received from the hands-free user input device.

33. The device of claim 32 wherein the overlay grid on the display defines the boundaries of the objects to the user.

34. The device of claim 33 wherein the third-party application comprises an operating system that controls the execution of the navigation application.

35. The device of claim 32 wherein the controller is further configured to execute the navigation application to change the focus between the objects if the user input signals are generated before the predetermined period of time expires.

36. The device of claim 32 wherein the objects are associated with one or more third-party application functions executable by the controller.

37. The device of claim 32 wherein the objects comprise regions.

38. The device of claim 32 wherein the objects comprise sub-regions.

39. The device of claim 38 wherein the sub-regions are within the scope of the regions.

40. The device of claim 32 wherein the objects comprise third-party application desktop level controls.

41. The device of claim 40 wherein the desktop level controls are within the scope of the sub-regions.

42. The device of claim 32 further comprising a port communicatively connected to the controller to receive the user input signals.

43. The device of claim 42 wherein the port comprises a wireless interface.

44. The device of claim 32 wherein the electronic device comprises a computing device.

45. A system comprising:
a hands-free user input device to generate user input signals;
an electronic device to receive the user input signals;
a display associated with the electronic device to display a graphical user interface of a third-party application; and
a controller in the electronic device configured to execute the third-party application to display the graphical user interface, and to execute an independent navigation application to:
  receive the user input signals generated by the hands-free user input device;
  overlay a grid on the graphical user interface of the third-party application to partition the graphical user interface into a plurality of objects;
  set a focus to one of the objects;
  change the focus between the objects responsive to receiving the user input signals from the hands-free user input device; and
  automatically select the object having the focus after a predetermined period of time in which no user input signals are received from the hands-free user input device.

46. The system of claim 45 wherein the hands-free input device generates the user input signals responsive to a user's aspirations.

47. The system of claim 46 wherein the controller is configured to execute the navigation application to cycle the focus between the objects in a clockwise direction responsive to a user's aspirations.

48. The system of claim 46 wherein the controller is configured to execute the navigation application to cycle the focus between the objects in a counter-clockwise direction responsive to the user's aspirations.

49. The system of claim 46 wherein the controller is configured to execute the navigation application to change the speed of movement of a cursor proportionally to the force with which the user aspirates into the user input device.

50. The system of claim 45 wherein the user input device comprises a microphone that generates the user input signals responsive to a user's predetermined voice command.

51. The system of claim 45 wherein the user input device comprises a remote control.

52. The system of claim 45 wherein the controller is further configured to execute the navigation application to change the focus between the objects if the controller receives the user input signals before the predetermined period of time expires.

53. The system of claim 45 wherein the controller is further configured to vary the predetermined period of time according to user customizations.

54. The system of claim 45 wherein the electronic device comprises a port communicatively connected to the user input device and the controller.

55. The system of claim 54 wherein the port comprises a wireless transceiver that communicates with a corresponding wireless transceiver associated with the user input device.

56. The system of claim 45 wherein the graphical user interface comprises an on-screen keyboard having one or more keys and a word prediction section, and wherein the controller is configured to execute the navigation application to partition the keys and the word prediction section into groupings of selectable objects.

57. The system of claim 56 wherein the controller is configured to execute the navigation application to permit substantially simultaneous focus between the on-screen keyboard and a third-party application object displayed on the graphical user interface.

58. The system of claim 56 wherein the on-screen keyboard includes a plurality of layouts, and wherein the controller is configured to execute the navigation application to switch between different on-screen keyboard layouts responsive to user input.

59. The system of claim 56 wherein the controller is configured to execute the navigation application to alter the degree of transparency of the on-screen keyboard responsive to user input.

60. The system of claim 56 wherein the controller is configured to execute the navigation application to move the position of the on-screen keyboard on the graphical user interface responsive to user input.

* * * * *

UNITED STATES PATENT AND TRADEMARK OFFICE
CERTIFICATE OF CORRECTION

PATENT NO. : 7,624,355 B2 Page 1 of 1
APPLICATION NO. : 10/855812
DATED : November 24, 2009
INVENTOR(S) : Robin C. Baneth It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1286 days.

Signed and Sealed this

Twenty-sixth Day of October, 2010

David J. Kappos
*Director of the United States Patent and Trademark Office*